(12) United States Patent
Achyuth et al.

(10) Patent No.: US 10,868,855 B2
(45) Date of Patent: Dec. 15, 2020

(54) FILE CONTAINERIZATION AND MANAGEMENT

(71) Applicant: Citrix Systems, Inc., Fort Lauderdale, FL (US)

(72) Inventors: Nandikotkur Achyuth, Bangalore (IN); Satish Vanahalli, Bangalore (IN); Arnav Akhoury, Bangalore (IN)

(73) Assignee: Citrix Systems, Inc., Fort Lauderdale, FL (US)

(*) Notice: Subject to any disclaimer, the term of this patent is extended or adjusted under 35 U.S.C. 154(b) by 0 days.

(21) Appl. No.: 16/371,383

(22) Filed: Apr. 1, 2019

(65) Prior Publication Data

US 2020/0314167 A1 Oct. 1, 2020

(51) Int. Cl.
*H04L 29/06* (2006.01)
*G06F 21/62* (2013.01)
(Continued)

(52) U.S. Cl.
CPC .......... *H04L 67/08* (2013.01); *G06F 9/45545* (2013.01); *G06F 16/196* (2019.01); *G06F 21/6209* (2013.01); *H04L 67/42* (2013.01)

(58) Field of Classification Search
None
See application file for complete search history.

(56) References Cited

U.S. PATENT DOCUMENTS

| 10,417,184 B1* | 9/2019 | Long | G06F 16/164 |
| 2006/0047956 A1* | 3/2006 | Calvin | G06F 21/6218 |
| | | | 713/165 |

(Continued)

OTHER PUBLICATIONS

"Docker Documentation", accessed via https://docs.docker.com/ on Jan. 9, 2020, and related materials accessible at https://docker.com/.

(Continued)

*Primary Examiner* — Natasha D Cox
(74) *Attorney, Agent, or Firm* — Pierce Atwood LLP

(57) ABSTRACT

This disclosure is directed to embodiments of systems and methods for containerizing files and managing policy data applied to the resulting containers. In some of the disclosed embodiments, a computing system determines that a file stored in storage medium is to be included in a container to be sent to at least one computing component associated with a device including a user interface. The computing system determines that the file is of a particular type and also determines code that can be used to access files of the particular type. The computing system combines the file and the code into the container such that container is configured to be executed by the at least one computing component so as to cause content of the file to be presented by the user interface. The computing system then sends the container to the at least one computing component. In some implementations, the container may further include policy information defining at least one of whether, how, where, when, or by whom the file can be accessed using the code. A communication link may be established between the computing system and the container at the at least one computing component and an instruction may be sent via the communication link that causes a change to the policy information.

20 Claims, 19 Drawing Sheets

(51) Int. Cl.
*H04L 29/08* (2006.01)
*G06F 16/188* (2019.01)
*G06F 9/455* (2018.01)

(56) References Cited

U.S. PATENT DOCUMENTS

| | | | | |
|---|---|---|---|---|
| 2007/0245409 | A1* | 10/2007 | Harris | H04L 69/10 |
| | | | | 726/5 |
| 2008/0016239 | A1* | 1/2008 | Miller | G06F 21/606 |
| | | | | 709/234 |
| 2008/0263101 | A1* | 10/2008 | Hara | G06F 40/154 |
| 2014/0096270 | A1* | 4/2014 | Beckwith | G06F 21/6209 |
| | | | | 726/30 |
| 2018/0260578 | A1* | 9/2018 | Orloff | G06F 21/53 |

OTHER PUBLICATIONS

International Search Report and Written Opinion dated Apr. 5, 2020 for International Patent Application No. PCT/US2020/019848.

* cited by examiner

Account Data — 802

| | |
|---|---|
| Account Identifier | A6789 |
| Device A Identifier | D3456 |
| Device A Operating System | Windows |
| Containerization Required | Yes |

File/Folder Metadata — 804

| | |
|---|---|
| Folder Identifier | FD5678 |
| File Identifier | FI2345 |
| File Type | CATIA |
| Container Required | Yes |
| Required Policies | A, B, C |

Container Configuration Data — 806

| | |
|---|---|
| Container Identifier | C1234 |
| File Identifier | FI2345 |
| File Type | CATIA |
| Operating System | Windows |
| Libraries | L876, L875 |

Container Policy Data — 808

| | |
|---|---|
| Container Identifier | C1234 |
| Pre-Access Authentication Required | Yes |
| Authentication Type(s) | User, Secondary, Password |
| Authorized User | John Doe |
| Secondary Authorization Person/Group | Jane Smith |
| Access Password | PW789 |
| Access Location Restrictions | None |
| Access Start Time | Immediate |
| Access Expiration Time | None |
| Purge/Destroy File | No |
| View Rights | Yes |
| Edit Rights | Yes |

Container Security Data — 810

| | |
|---|---|
| Container Identifier | C1234 |
| Private Key | xyz123... |
| Public Key | abc234... |

FIG. 8

FILE CONTAINERIZATION AND MANAGEMENT

BACKGROUND

Various file serving systems have been developed that allow users to retrieve files or other data from a repository. ShareFile®, offered by Citrix Systems, Inc., of Fort Lauderdale, Fla., is one example of a system that provides such a capability.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a computing system determines that a file stored in storage medium is to be included in a container to be sent to at least one computing component associated with a device including a user interface. The computing system determines that the file is of a particular type and also determines code that can be used to access files of the particular type. The computing system combines the file and the code into the container such that container is configured to be executed by the at least one computing component so as to cause content of the file to be presented by the user interface of the device. The computing system then sends the container to the at least one computing component.

In some implementations, the computing system may encrypt the file prior to combining the file and the code into the container. The computing system may determine that a user of the device is authorized to access the file, and based at least in part on the user being authorized to access the file, may send a key for decrypting the file to the at least one computing component.

Further, in some implementations, the container may further include policy information defining at least one of whether, how, where, when, or by whom the file can be accessed using the code. A communication link may be established between the computing system and the container at the at least one computing component and an instruction may be sent via the communication link that causes a change to the policy information.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 8 shows examples of data that may be included in the database(s) shown in FIG. 7;

DETAILED DESCRIPTION

File server systems typically expect that the computing devices to which they transfer files have installed on them, or are capable of downloading, software that can be used to access such files. File server systems are also typically incapable of controlling the manner in which any files so transferred can subsequently be accessed and used by the recipient devices.

Offered is a system that can embed files into containers along with software that can be used to view, and in some cases, edit the files. By sending such containers to recipient devices, rather than just sending files, the recipient devices are able to access and use the embedded files without requiring any file-specific software to be separately installed on the devices. In some embodiments, policy data for controlling the access and/or use of transferred files may also be embedded into such containers. Such policy data may, for example, control whether, how, where, when, and/or by whom the transferred files may be accessed and/or used by recipient devices. Further, in some embodiments, such containers can be configured so that the system can modify the policy data included in the containers while the containers are present on recipient devices, thus enabling a system administrator or other authorized user to manage the manner in which files can be accessed and/or used even after such files have been transferred to recipient devices.

For purposes of reading the description of the various embodiments below, the following descriptions of the sections of the specification and their respective contents may be helpful:

Section A provides an introduction to an example embodiment of a file containerization and management system (FCMS) configured in accordance with the present disclosure;

Section B describes a network environment and computing environment which may be useful for practicing embodiments described herein;

Section C describes example embodiments of appliances that may deployed in a networking environment such as that describe in Section B;

Section D describes embodiments of systems and methods for virtualizing an application delivery controller;

Section E describes embodiments of systems and methods for enabling file sharing over one or more networks;

Section F described embodiments of systems and methods for implementing servers in a cloud-based environment;

Section G provides a detailed description of example embodiments of a file server system configured in accordance with the present disclosure; and Section H describes example implementations of methods, systems, and computer-readable media in accordance with the present disclosure.

A. Introduction to an Illustrative Embodiment of a File Containerization & Management System (FCMS)

Figure 1:
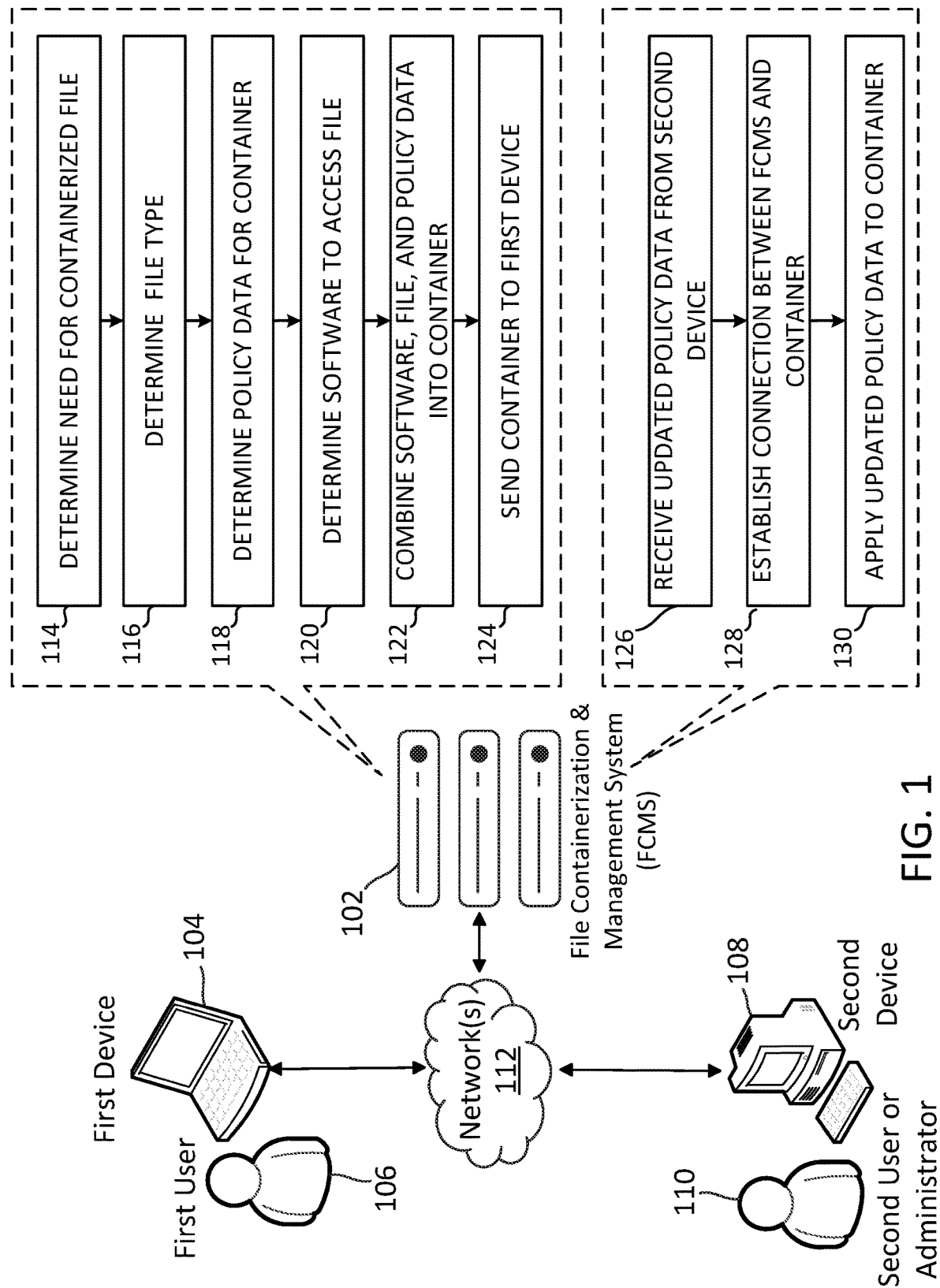
FIG. 1 is a diagram illustrating certain features of an embodiment of a file containerization and management system (FCMS) configured in accordance with the present disclosure.

FIG. 1 shows an example embodiment of a computer network environment including a file containerization & management system (FCMS) 102 that may be used to implement various aspects of the present disclosure. Although FIG. 1 illustrates the FCMS 102 as including just three servers, it should be appreciated that the FCMS 102 may include any number of servers as well as any number of additional or different components, such as one or more databases, other network components, etc.

As shown in FIG. 1, the FCMS 102 may communicate with other computing devices via one or more networks 112, including a first device 104 operated by a first user 106 and a second device 108 operated by a second user 110. As shown, the second user 110 may be a system administrator, although other types of users may also operate the second device 108 and/or the operations performed by the second device 108 may be automated in some embodiments. Although the first device 104 and the second device 108 are shown is FIG. 1 as stand-alone computers, it should be appreciated that one or both of the first device 104 and the second device 108 shown in FIG. 1 may instead represent other types of computing devices or systems that can be operated by users 106, 110. In some embodiments, for example, one or both of the first device 104 and the second device 108 may be implemented as a server-based virtual computing environment that can be remotely accessed using a separate computing device operated by the users 106, 110.

As FIG. 1 illustrates, in some embodiments, the FCMS 102 may somehow determine (step 114) that a containerized file is to be generated. In some embodiments, for example, the FCMS 102 may receive a file access request from the first device 104 or the second device 108 that indicates a need for a containerized version of a particular file. In other embodiments, a need for a containerized file may be inferred or somehow ascertained by the FCMS 102 based at least in part on the circumstances or content of a file access request, metadata associated with files and/or users, and/or other messages exchanged with the FCMS 102 in addition to a file access request.

In some embodiments, for example, the first user 106 may access a web page identifying one or more files that are available for download, and the first device 104 may send a file access request to the FCMS 102 in response to the first user 106 selecting one of the identified files. The first user 106 may, for example, be an authorized user of the FCMS 102 and may gain access to a list of files available for download after successfully authenticating his or her identity to the FCMS 102 (e.g., by entering a user name or password, via biometric authentication, etc.). In such embodiments, the determination of the step 114 may thus be based at least in part on a file access request that is received from the first device 104 in response to the first user 106 selecting one of the items on such a list.

In other embodiments, the second user 110 may additionally or alternatively be an authorized user of the FCMS 102 and may gain access to a list of files available for download after successfully authenticating his or her identity to the FCMS 102 (e.g., by entering a user name or password, via biometric authentication, etc.). The second user 110 may want to allow the first user 106 to be able to download one or more of the files on the list, and may thus cause the second device 108 to send a file access request to the FCMS 102 that identifies the file(s) for which downloading by the first device 104 is desired. Alternatively, the second user 110 may want to upload one or more files from the second device 108 to the FCMS 102 and make such uploaded files immediately available for download by the first user 106 of the first device 104. In such a circumstance, the second device 108 may indicate to the FCMS 102 that the file(s) being uploaded are to be made immediately downloadable by the first device 104. In either case, the determination of the step 114 may be based at least in part on receipt of a file access request from the second device 108.

Additionally or alternatively, in some embodiments, the determination of step 114 may made in response to the first user 106 of the first device 104 selecting a link or other user interface element identifying a file to be accessed. Such a link or element may, for example, have been included in an email, text message, or other communication received by the first device 104. The link or user-interface element may, for example, have been generated by the FCMS 102 and sent to the first device 104 when the first user 106 selected a file available for download from the FCMS 102. Alternatively, the second user 110 operating the second device 108 may have selected a file available for download from the FCMS 102 or caused a file to be uploaded to the FCMS 102, and the second device 108 or the system 102 may have sent a communication to the first device 104 containing a link or other user interface element identifying a file that is available for download by the first device 104. Selection of that link or other element may, for example, cause a file access request to be sent from the first device 104 to the FCMS 102 and the determination of the step 114 may be based at least in part on that request.

In yet other embodiments, the determination of the step 114 may additionally or alternatively be based at least in part on a file access request that is generated and sent to the FCMS 102 in response to the first user 106 attempting to access a file that has already been downloaded from the FCMS 102 but for which the first device 104 does not have the software needed to access it. In some embodiments, for example, such a file access request may be generated by an application on the first device 104 that is used to attempt to open or access such a file. Such an application may, for example, be a mobile or desktop application installed on the first device 104 before the file is received by the first device. Citrix ShareFile® offered by Citrix Systems, Inc., of Fort Lauderdale, Fla., is one example of such a preinstalled application.

As further shown in FIG. 1, upon determining (step 114) that a containerized file is to be generated, the FCMS 102 may determine (step 116) the type of file that is to be containerized. For example, the FCMS 102 may determine that the file identified in an access request is a Word file, a PDF file, a CATIA file, an MP3 file, or the like. The file type determination may be determined, for example, based on metadata associated with the stored file, the extension appended to the file name, the content of the access request, etc.

As FIG. 1 also illustrates, the FCMS 102 may additionally determine (step 118) policy data for the container. The container-specific policy data may, for example, be set by a system administrator and/or a person who uploaded the file to the FCMS 102, and/or may be based on one or more default values. Examples of policy data and ways in which such policy data can control whether, how, where, when, and/or by whom a file within the container can be accessed and used by a recipient device are described in detail below.

As further shown in FIG. 1, the FCMS 102 may also determine (step 120) software that can be used to access the determined file type. As explained in more detail below, in some embodiments, the determined software may, for example, include both a control application and one or more libraries, e.g., from a software development kit (SDK) for an application or system corresponding to the determined file type, that can be used to process files of the determined type.

Once the pertinent software and policy data have been determined, they may be combined (step 122) along with the file into a container, and the resulting container may be sent to the first device 104. As explained in more detail below, once the first device 104 receives the container from the FCMS 102, the first device 104 can execute the embedded software so as allow the first user 106 to view (i.e., visually and/or audibly perceive), and possibly edit, the embedded file via a user interface in accordance with the policies established by the embedded policy data. In some embodiments, the embedded file may be encrypted and access to a decryption key for the file may be provided in accordance with the policy data, as described in more detail below.

As FIG. 1 also illustrates, after the container has been sent to the first device 104, the FCMS 102 may receive (step 126) updated policy data for the container from the second device 108. The second device 108 may, for example, be operated by a system administrator, the author of the file, etc. As shown, a connection may thereafter be established (step 128) between the FCMS 102 and the container, and the FCMS 102 may apply the updated policy data to the container via the connection. In some embodiments, for example, the software embedded in the container may include a process for establishing a connection with the FCMS 102 and allowing the FCMS 102 to update the policy data within the container each time the container is executed by the first device 104.

Accordingly, the FCMS 102 shown in FIG. 1 allows files to be transferred to recipient devices along with software for accessing such files, thus eliminating the need for the recipient devices to already have or obtain separate file-specific software, and also allows a system administrator, etc., the ability to exercise control over the circumstances in which transferred files can be accessed and/or used by recipient devices.

Additional details and example implementations of embodiments of the present disclosure are set forth below in Section H, following a description of example systems and network environments in which such embodiments may be deployed.

B. Network and Computing Environment

Figure 2A:
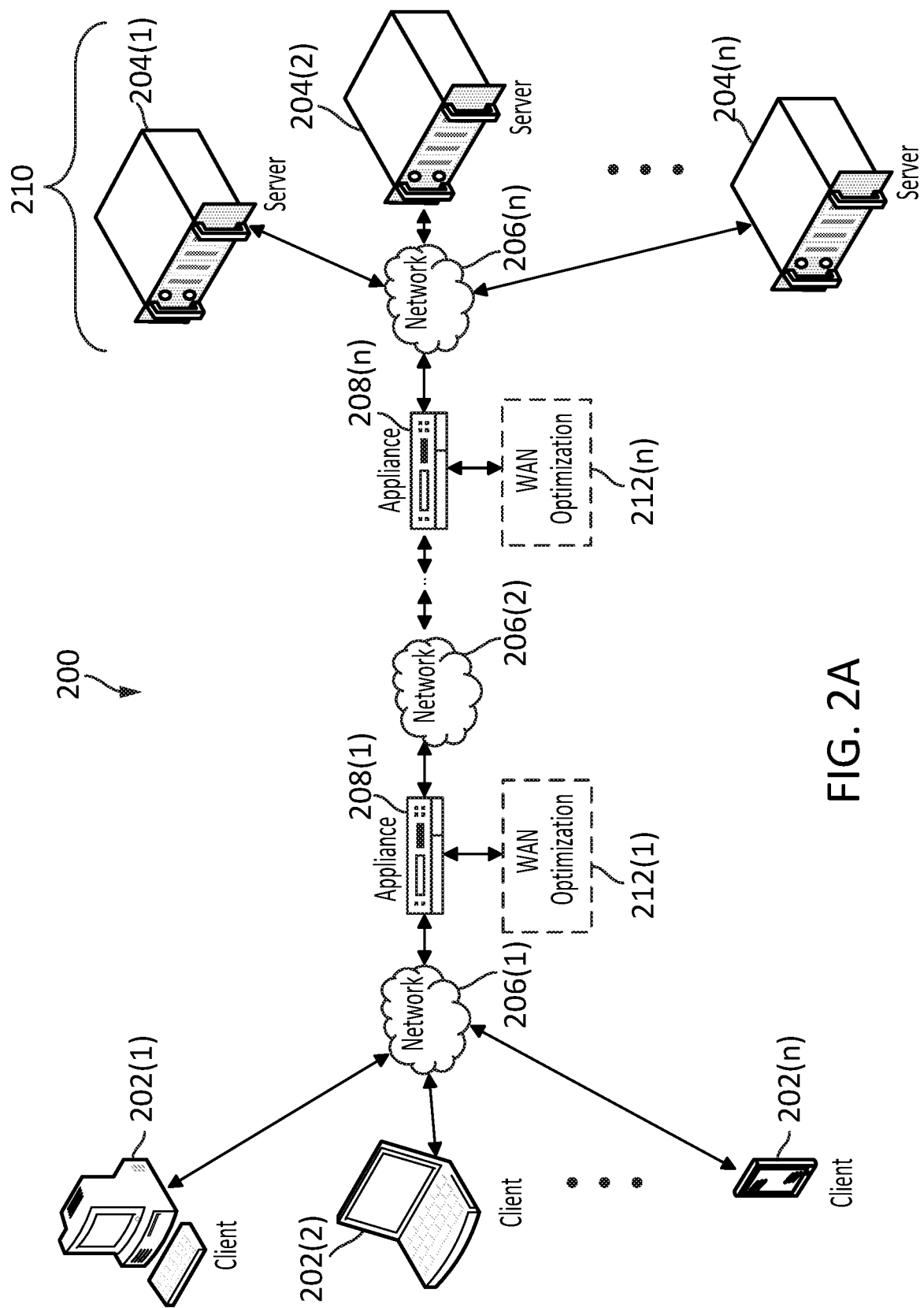
FIG. 2A is a diagram of a network computing environment in which some embodiments of the file containerization and management techniques disclosed herein may be deployed.

Referring to FIG. 2A, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, the first device 104 and the second device 108 shown in FIG. 1 may, for example, correspond to respective ones of the clients 202 shown in FIG. 2A.

Although the embodiment shown in FIG. 2A shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may each be a private network such as a local area network (LAN) or a company Intranet, while the network 206(2) may be a public network, such as a wide area network (WAN) or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 2A, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, each appliance 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one or more of the appliances 208 may be implemented as network devices sold by Citrix Systems, Inc., of Fort Lauderdale, Fla., such as Citrix Gateway™ or Citrix ADC™.

As shown in FIG. 2A, in some embodiments, groups of the servers 204 may operate as one or more server farms 210. The servers 204 of each such server farm 210 may be logically grouped, and may either be geographically co-located (e.g., on premises) or geographically dispersed (e.g., cloud based) from the clients 202 and/or other servers 204. In some embodiments, as explained in more detail below, one or more server farms 210 may execute one or more applications on behalf of one or more of clients 202 (e.g., as an application server system) and/or may facilitate the sharing of files between the clients 202 (e.g., as a file sharing system), although other uses are possible, such as a file server, gateway server, proxy server, or other similar server uses. In some embodiments, two or more server farms 210 may communicate with one another, e.g., via respective appliances 208 connected to the network 206(2), to allow multiple server-based processes to interact with one another. For example, in some embodiments, one server farm 210 may operate as a file containerization and management system (FCMS) 102 (as disclosed herein) and another server farm 210 may operate as an application server system (described in more detail below), with one or more servers 204 of the application serving system providing a virtual computing environment to a client 202 and also receiving a containerized file from the FCMS 102 on behalf of the client 202.

As also shown in FIG. 2A, in some embodiments, one or more of the appliances 208 may include, be replaced by, or be in communication with, one or more additional appliances, such as WAN optimization appliances 212(1)-212(n), referred to generally as WAN optimization appliance(s) 212. For example, each WAN optimization appliance 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller. In some embodiments, for example, one or more of the appliances 212 may be implemented as products sold by Citrix Systems, Inc., of Fort Lauderdale, Fla., such as Citrix SD-WAN™ or Citrix Cloud™.

Figure 2B:
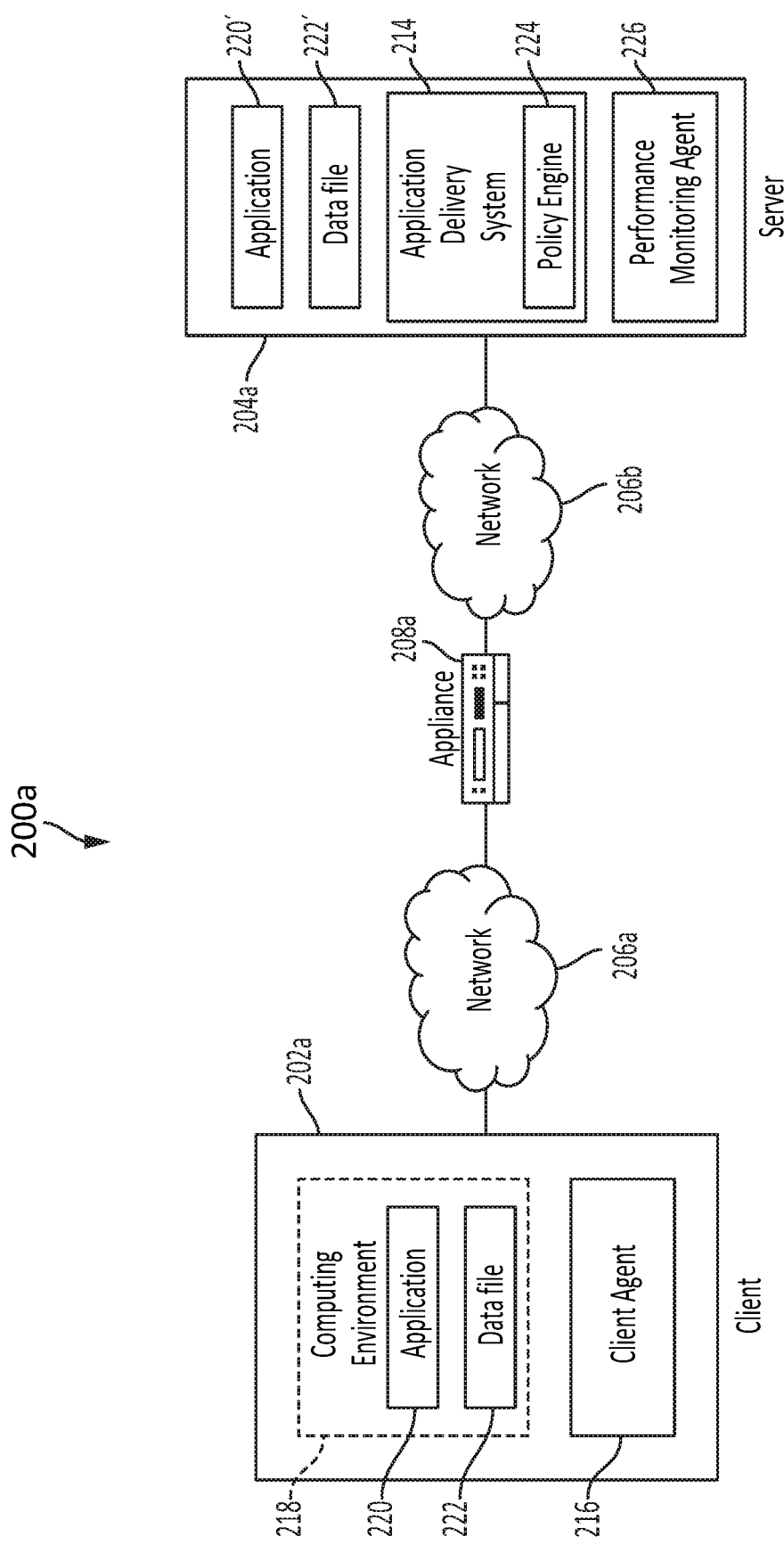
FIG. 2B is a diagram illustrating how a network computing environment like that shown in FIG. 2A may be configured to deliver a computing environment from a server to a client.

Referring to FIG. 2B, an example network environment 200a for delivering and/or operating a computing environment on a client 202a is shown. As shown in FIG. 2B, in some embodiments, a client 202a may include a computing environment 218, and a server 204a may include an application delivery system 214 for delivering a computing environment, application, and/or data files to one or more clients 202.

In some embodiments, each client 202 may additionally include a client agent 216 for establishing and exchanging communications with the appliance 208 and/or the server(s) 204 via a network 206. The client 202a may, for example, have installed and/or execute one or more applications that are in communication with the network 206a. In some embodiments, the client agent 216 may intercept network communications from a network stack used by the one or more applications. For example, the client agent 216 may intercept a network communication at any point in a network stack and redirect the network communication to a destination desired, managed, and/or controlled by the client agent 216, for example, to intercept and redirect a transport layer connection to an IP address and port controlled and/or managed by the client agent 216. The client agent 216 may thus, in some embodiments, transparently intercept any protocol layer below the transport layer, such as the network layer, and any protocol layer above the transport layer, such as the session, presentation, or application layers. The client agent 216 may, for example, interface with the transport layer to secure, optimize, accelerate, route, and/or load-balance any communications provided via any protocol carried by the transport layer.

In some embodiments, the client agent 216 may be implemented as an Independent Computing Architecture (ICA) client developed by Citrix Systems, Inc. The client agent 216 may perform acceleration, streaming, monitoring, and/or other operations. For example, the client agent 216 may accelerate streaming an application from the server 204a to the client 202a. The client agent 216 may also perform end-point detection/scanning and/or collect end-point information about the client 202a for the appliance 208a and/or the server 204a. The appliance 208a and/or the server 204a may use the collected information to determine and provide access, authentication, and/or authorization control of the client's connection to the network 206a. For example, the client agent 216 may identify and determine one or more client-side attributes, such as: the operating system and/or a version of an operating system, a service pack of the operating system, a running service, a running process, a file, presence or versions of various applications of the client, such as antivirus, firewall, security, and/or other software.

The computing environment 218 may, for example, execute or operate an application 220 that accesses, processes and/or uses a data file 222. The computing environment 218, application 220 and/or data file 222 may be delivered via an appliance 208a and/or the server 204a.

The appliance 208a may accelerate delivery of all or a portion of the computing environment 218 to the client 202a, for example by the application delivery system 214. For example, the appliance 208a may accelerate delivery of a streaming application 220' and data file 222' processable by the application 220 from a data center to a remote user location by accelerating transport layer traffic between the client 202a and the server 204a. Such acceleration may be provided by one or more techniques, such as: 1) transport layer connection pooling, 2) transport layer connection multiplexing, 3) transport control protocol buffering, 4) compression, 5) caching, or other techniques. The appliance 208a may also provide load balancing of servers 204 in a server farm 210 (shown in FIG. 2A) to process requests from the clients 202, act as a proxy or access server to provide access to the one or more servers 204, provide security and/or act as a firewall between the clients 202 and the servers 204, provide Domain Name Service (DNS) resolution, provide one or more virtual servers or virtual internet protocol servers, and/or provide secure virtual private network (VPN) connections from the clients 202 to the servers 204, such as a secure socket layer (SSL) VPN connection and/or provide encryption and decryption operations.

The application delivery system 214 may deliver the computing environment 218 to a user (e.g., client 202a), remote or otherwise, based on authentication and authorization policies applied by a policy engine 224. A remote user may obtain a computing environment and access to server stored applications 220' and data files 222' from any network-connected device (e.g., the client 202a). For example, the appliance 208a may request an application 220' and data file 222' from the server 204a. In response to the request, the application delivery system 214 and/or the server 204a may deliver the application 220' and data file 222' to the client 202a, for example via an application stream to operate in the computing environment 218 on client the 202a, or via a remote-display protocol or otherwise via remote-based or server-based computing. In an embodiment, application delivery system 214 may be implemented as any portion of the Citrix Workspace™ by Citrix Systems, Inc., of Fort Lauderdale, Fla., such as Citrix Virtual Apps and Desktops™.

The policy engine 224 may control and manage the access to, and execution and delivery of, applications. For example, the policy engine 224 may determine the one or more applications a user or client 202 may access and/or how the application should be delivered to the user or client 202, such as a server-based computing, streaming or delivering the application locally to the client 202 for local execution.

For example, in operation, the client 202a may request execution of an application (e.g., application 220') and the application delivery system 214 of the server 204a may determine how to execute the application 220', for example based upon credentials received from the client 202a and a user policy applied by the policy engine 224 associated with the credentials. For example, the application delivery system 214 may enable the client 202a to receive application-output data generated by execution of the application on the server 204a, may enable client the 202a to execute the application 220 locally after receiving the application from the server 204a, or may stream the application via one or more networks 206a, 206b to the client 202a. For example, in some embodiments, the application 220 may be a server-based or a remote-based application executed on the server 204a on behalf of the client 202a. The server 204a may display output to the client 202a using a thin-client or remote-display protocol, such as the Independent Computing Architecture (ICA) protocol by Citrix Systems, Inc. The application 220 may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

As shown, one or more servers 204 may also include a performance monitoring service or agent 226. In some embodiments, a dedicated one or more servers 204 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on one or more clients 202 (e.g., the client agent 216), one or more servers 204 (e.g., the agent 226) and/or one or more appliances 208 and/or 212 (agent not shown). In general, the monitoring agents (e.g., agent 216 and/or agent 226) may execute transparently (e.g., in the background) to any application and/or user of the device. In some embodiments, the monitoring agent 226 may be implemented as Citrix Analytics™ by Citrix Systems, Inc., of Fort Lauderdale, Fla.

The monitoring agents may, for example, monitor, measure, collect, and/or analyze data on a predetermined frequency, based upon an occurrence of given event(s), or in real time during operation of the network environment 200a. The monitoring agents may monitor resource consumption and/or performance of hardware, software, and/or communications resources of the clients 202, networks 206, appliances 208 and/or 212, and/or servers 204. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for the application delivery system 214. For example, based upon one or more monitored performance conditions or metrics, the application delivery system 214 may be dynamically adjusted, for example periodically or in real-time, to optimize application delivery by the servers 204 to the clients 202 based upon network environment performance and conditions.

Figure 2C:
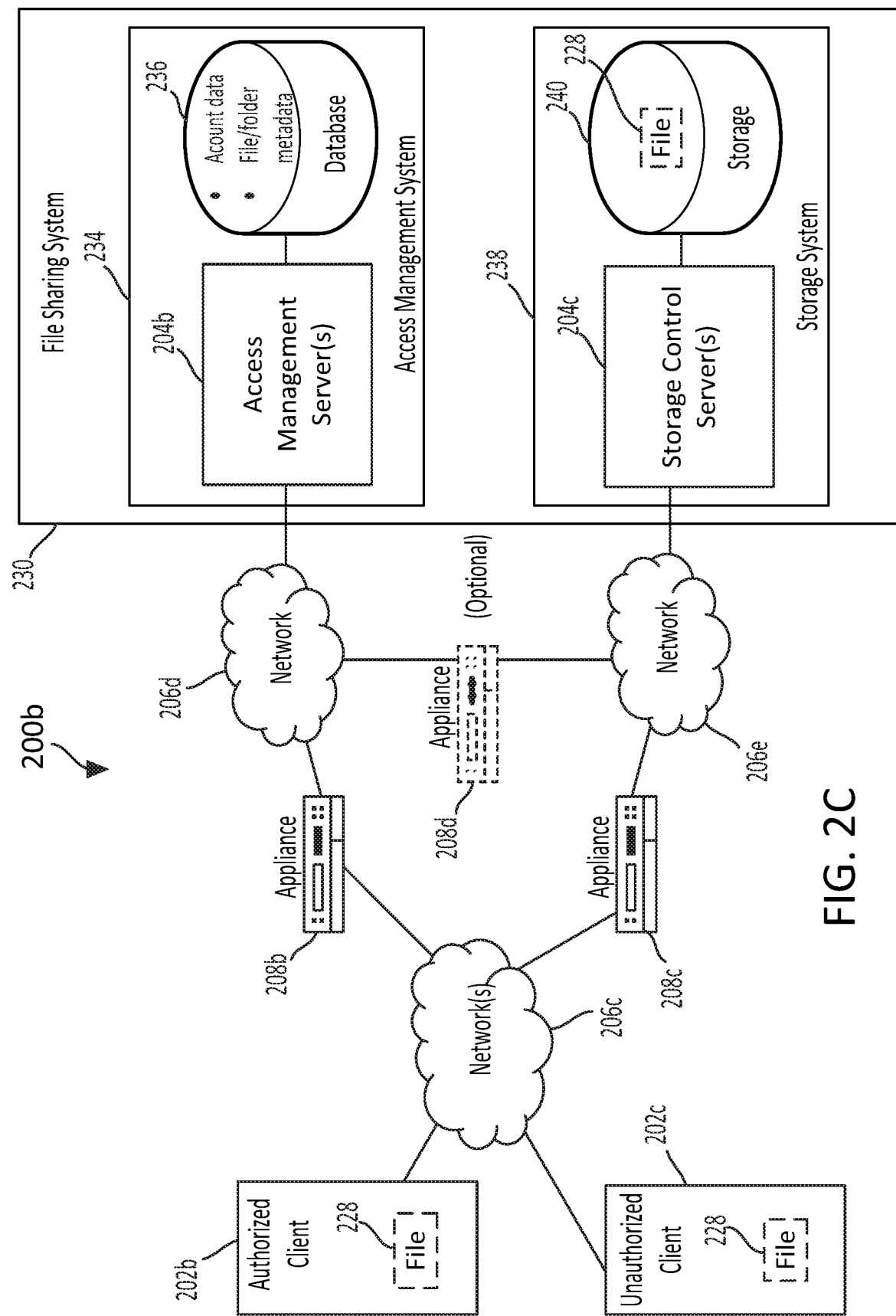
FIG. 2C is a diagram illustrating how a network computing environment like that shown in FIG. 2A may be configured to allow clients to access an example embodiment of a server-based file sharing system.

FIG. 2C shows an example network environment 200b for allowing an authorized client 202b and/or an unauthorized client 202c to upload a file 228 to a file sharing system 230 or download a file 228 from the file sharing system 230. The authorized client 202b may, for example, be a client 202 operated by a user having an active account with the file sharing system 230, while the unauthorized client 202c may be operated by a user who lacks such an account.

As FIG. 2C illustrates, in some embodiments, the file sharing system 230 may include an access management system 234 and a storage system 238. As shown, the access management system 234 may include one or more access management servers 204b and a database 236, and the storage system 238 may include one or more storage control servers 204c and a storage medium 240. In some embodiments, the access management server(s) 204b may, for example, allow a user of the client 202b to log in to his or her account, e.g., by entering a user name and password corresponding to account data stored in the database 236. Once the user of the client 202b has logged in, the access management server 204b may enable the user to view (via the authorized client 202b) information identifying various folders represented in the storage medium 240, which is managed by the storage control server(s) 204c, as well as any files 228 contained within such folders. File/folder metadata stored in the database 236 may be used to identify the files 228 and folders in the storage medium 240 to which a particular user has been provided access rights.

In some embodiments, the clients 202b, 202c may be connected to one or more networks 206c (which may include the Internet), the access management server(s) 204b may include webservers, and an appliance 208b may load balance requests from the authorized client 202b to such webservers. The database 236 associated with the access management server(s) 204b may, for example, include information used to process user requests, such as user account data (e.g., username, password, access rights, security questions and answers, etc.), file and folder metadata (e.g., name, description, storage location, access rights, source IP address, etc.), and logs, among other things. Although the clients 202b, 202c are shown is FIG. 2C as stand-alone computers, it should be appreciated that one or both of the clients 202b, 202c shown in FIG. 2C may instead represent other types of computing devices or systems that can be operated by users. In some embodiments, for example, one or both of the authorized client 202b and the unauthorized client 202c may be implemented as a server-based virtual computing environment that can be remotely accessed using a separate computing device operated by users, such as described above in connection with FIG. 2B.

In some embodiments, the access management system 234 may be logically separated from the storage system 238, such that files 228 and other data that are transferred between clients 202 and the storage system 238 do not pass through the access management system 234. Similar to the access management server(s) 204b, one or more appliances 208b-d may load-balance requests from the clients 202b, 202c received from the network(s) 206c (which may include the Internet) to the storage control server(s) 204c. In some embodiments, the storage control server(s) 204c and/or the storage medium 240 may be hosted by a cloud-based service provider (e.g., Amazon Web Services or Microsoft Azure). In other embodiments, the storage control server(s) 204c and/or the storage medium 240 may be located at a data center managed by an enterprise of a client 202, or may be distributed among some combination of a cloud-based system and an enterprise system, or elsewhere.

After a user of the authorized client 202b has properly logged in to an access management server 204b, the server 204b may receive a request from the client 202b for access to one of the files 228 or folders to which the logged in user has access rights. The request may either be for the authorized client 202b to itself to obtain access to a file 228 or folder or to provide such access to the unauthorized client 202c. In some embodiments, in response to receiving an access request from an authorized client, the access management server 204b may communicate with the storage control server(s) 204c (e.g., either over the Internet via appliances 208b and 208c or via an appliance 208d positioned between networks 206d and 206e) to obtain a token generated by the storage control server 204c that can subsequently be used to access the identified file 228 or folder.

In some embodiments, the generated token may, for example, be sent to the authorized client 202b, and the authorized client 202b may then send a request for a file 228, including the token, to the storage control server(s) 202c. In other embodiments, the authorized client 202b may send the generated token to the unauthorized client 202c so as to allow the unauthorized client 202c to send a request for the file 228, including the token, to the storage control server(s) 202c. In yet other embodiments, an access management server 204b may, at the direction of the authorized client 202b, send the generated token directly to the unauthorized client 202c so as to allow the unauthorized client 202c to send a request for the file 228, including the token, to the storage control server(s) 202c. In any of the forgoing scenarios, the request sent to the storage control server(s) may, in some embodiments, include a uniform resource locator (URL) that resolves to an internet protocol (IP) address of the storage control server(s) 202c, and the token may be appended to or otherwise accompany the URL. Accordingly, providing access to one or more clients 202 may be accomplished, for example, by causing the authorized client 202b to send a request to the URL address, or by sending an email, text message or other communication including the token-containing URL to the unauthorized client 202c, either directly from the access management server(s) 204b or indirectly from the access management server(s) 204b to the authorized client 202b and then from the authorized client 202b to the unauthorized client 202c. In some embodiments, selecting the URL or a user interface element corresponding to the URL, may cause a request to be sent to the storage control server(s) 204c that either causes a file 228 to be downloaded immediately to the client that sent the request, or may cause the storage control server 204c to return a webpage to the client that includes a link or other user interface element that can be selected to effect the download.

In some embodiments, a generated token can be used in a similar manner to allow either an authorized client 202b or an unauthorized client 202c to upload a file 228 to a folder corresponding to the token. In some embodiments, for example, an "upload" token can be generated as discussed above when an authorized client 202b is logged in and a designated folder is selected for uploading. Such a selection may, for example, cause a request to be sent to the access management server(s) 204b, and a webpage may be returned, along with the generated token, that permits the user to drag and drop one or more files 228 into a designated region and then select a user interface element to effect the upload. The resulting communication to the storage control server(s) 204c may include both the to-be-uploaded file(s) 228 and the pertinent token. On receipt of the communication, a storage control server 204c may cause the file(s) 228 to be stored in a folder corresponding to the token.

In some embodiments, sending a request including such a token to the storage control server(s) 204c (e.g., by selecting a URL or user-interface element included in an email inviting the user to upload one or more files 228 to the file sharing system 230), a webpage may be returned that permits the user to drag and drop one or more files 228 into a designated region and then select a user interface element to effect the upload. The resulting communication to the storage control server(s) 204c may include both the to-be-uploaded file(s) 228 and the pertinent token. On receipt of the communication, a storage control server 204c may cause the file(s) 228 to be stored in a folder corresponding to the token.

In the described embodiments, the clients 202, servers 204, and appliances 208 and/or 212 (appliances 212 are shown in FIG. 2A) may be deployed as and/or executed on any type and form of computing device, such as any desktop computer, laptop computer, rack-mounted computer, or mobile device capable of communication over at least one network and performing the operations described herein. For example, the clients 202, servers 204 and/or appliances 208 and/or 212 may each correspond to one computer, a plurality of computers, or a network of distributed computers such as computer 246 shown in FIG. 2D.

Figure 2D:
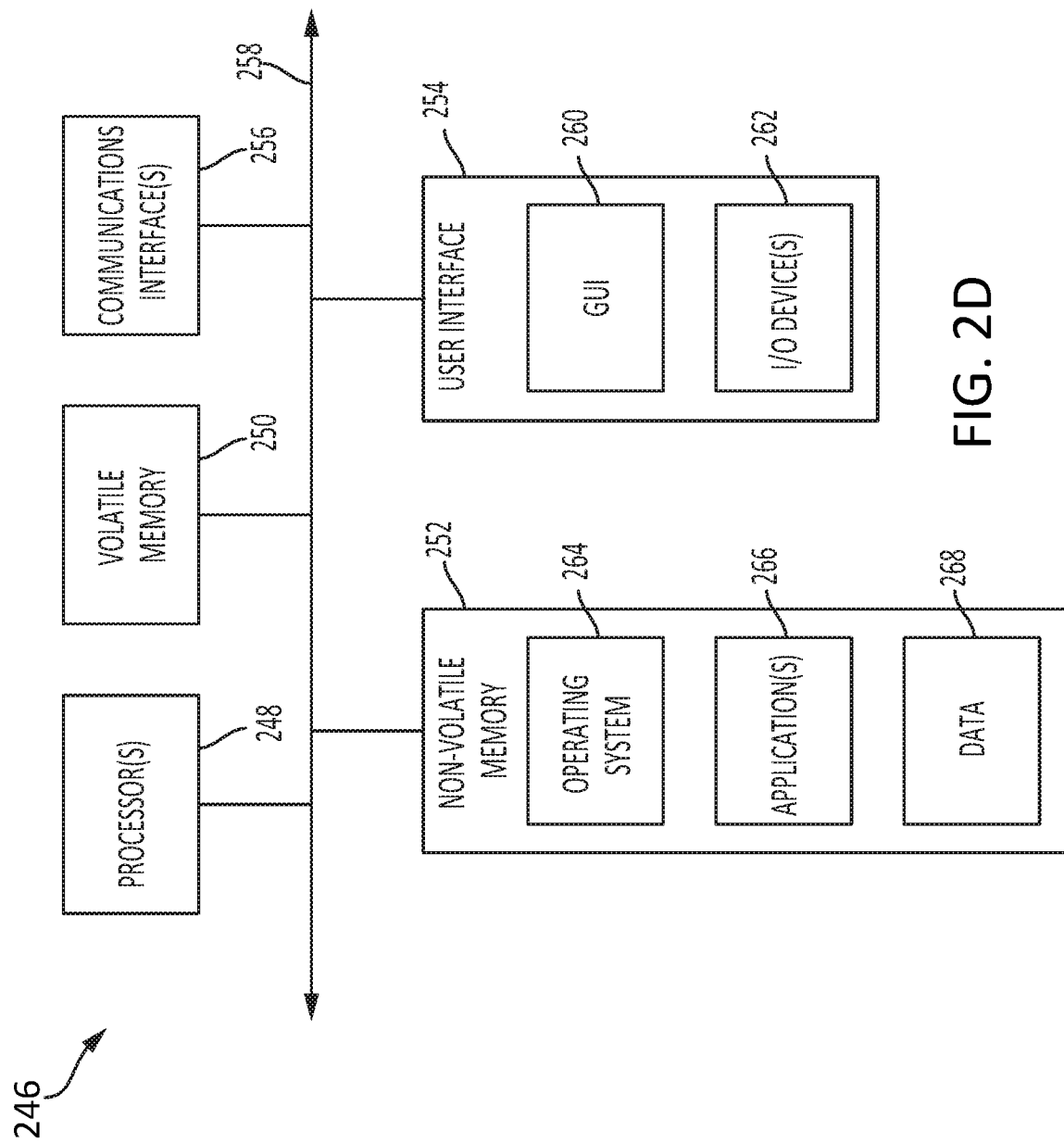
FIG. 2D is a block diagram of a computing device that may be used to implement one or more of the components of the computing environment shown in FIGS. 2A-C.

As shown in FIG. 2D, the computer 246 may include one or more processors 248, volatile memory 250 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, etc.) and one or more input/output (I/O) devices 262 (e.g., a mouse, a keyboard, etc.). The non-volatile memory 252 may store an operating system 264, one or more applications 266, and data 268 such that, for example, computer instructions of the operating system 264 and/or applications 266 are executed by the processor(s) 248 out of the volatile memory 250. Data may be entered using an input device of the GUI 260 or received from I/O device(s) 262. Various elements of the computer 246 may communicate via communication the bus 258. The computer 246 as shown in FIG. 2D is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 256 may include one or more interfaces to enable the computer 246 to access a computer network such as a LAN, a WAN, or the Internet through a variety of wired and/or wireless or cellular connections.

As noted above, in some embodiments, one or more computers 246 may execute an application on behalf of a user of a client computing device (e.g., a client 202), may execute a virtual machine, which provides an execution session within which applications execute on behalf of a user or a client computing device (e.g., a client 202), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of the network environment 200, clients 202, servers 204, and appliances 208 and 212 may be as described in U.S. Pat. No. 9,538,345, issued Jan. 3, 2017 to Citrix Systems, Inc., of Fort Lauderdale, Fla., the teachings of which are hereby incorporated herein by reference in their entirety.

C. Appliance Architecture

Figure 3:
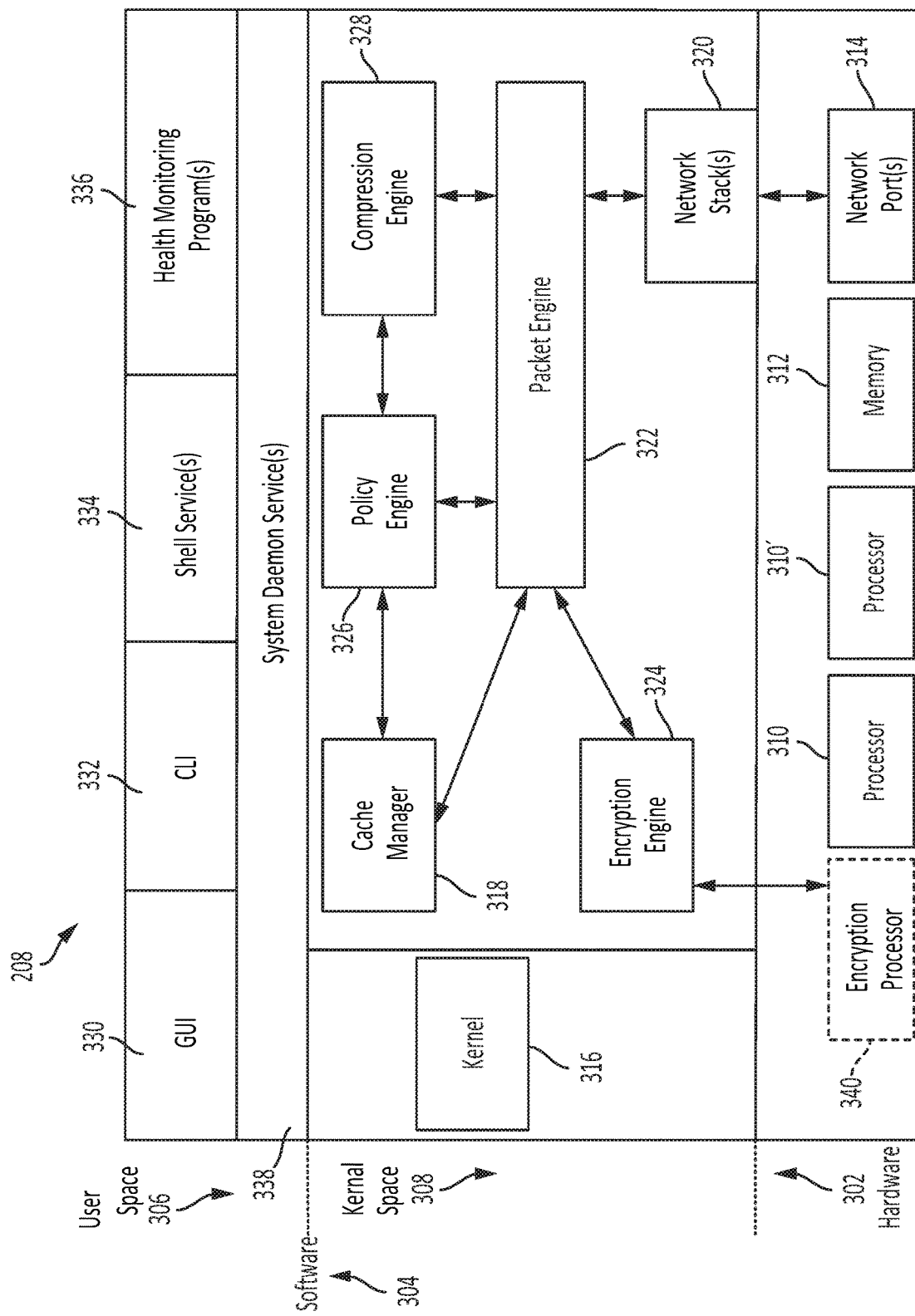
FIG. 3 is a block diagram illustrating components of an example embodiment of an appliance like those shown in FIGS. 2A-D.

FIG. 3 shows an example embodiment of an appliance 208. As described herein, the appliance 208 may be implemented as a server, gateway, router, switch, bridge or other type of computing or network device. As shown in FIG. 3, in some embodiments, the appliance 208 may include a hardware layer 302 and a software layer 304 divided into a user space 306 and a kernel space 308. The hardware layer 302 may provide the hardware elements upon which programs and services within the kernel space 308 and the user space 306 are executed, and may also allow programs and services within the kernel space 308 and the user space 306 to communicate data both internally and externally with respect to the appliance 208. As shown, the hardware layer 302 may include one or more processing units 310 for executing software programs and services, memory 312 for storing software and data, one or more network ports 314 for transmitting and receiving data over one or more networks 206, and an encryption processor 340 for encrypting and decrypting data such as in relation to Secure Socket Layer (SSL) or Transport Layer Security (TLS) processing of data transmitted and received over one or more networks 206.

An operating system (not shown in FIG. 3) of the appliance 208 allocates, manages, or otherwise segregates the available system memory into the kernel space 308 and the user space 306. The kernel space 308 may be reserved for running a kernel 316, including any device drivers, kernel extensions or other kernel related software. As known to those skilled in the art, the kernel 316 is the core of the operating system, and provides access, control, and management of resources and hardware-related elements of the appliance 208. The kernel space 308 may also include a number of network services or processes working in conjunction with a cache manager 318.

The appliance 208 may include one or more network stacks 320, such as a TCP/IP based stack, for communicating with the client(s) 202, server(s) 204, network(s) 206, and/or other appliances 208, 212. For example, the appliance 208 may establish and/or terminate one or more transport layer connections between the client(s) 202 and the server(s) 204. Each network stack 320 may include a buffer for queuing one or more network packets for transmission by the appliance 208.

The kernel space 308 may include the cache manager 318, a packet engine 322, an encryption engine 324, a policy engine 326, and a compression engine 328. One or more of the processes 318, 322, 324, 326 and 328 may thus run in the core address space of the operating system of the appliance 208, which may reduce the number of data transactions to and from the memory and/or context switches between kernel mode and user mode, for example since data obtained in kernel mode may not need to be passed or copied to a user process, thread or user level data structure.

The cache manager 318 may duplicate original data stored elsewhere or data previously computed, generated or transmitted to reducing the access time of the data. In some embodiments, the cache memory may be a data object in the memory 312 of the appliance 208, or may be a physical memory having a faster access time than memory the 312.

The policy engine 326 may include a statistical engine or other configuration mechanism to allow a user to identify, specify, define, or configure a caching policy and access, control and management of objects, data or content being cached by the appliance 208, and define or configure security, network traffic, network access, compression or other functions performed by the appliance 208.

The encryption engine 324 may process any security related protocol, such as SSL or TLS. For example, the encryption engine 324 may encrypt and decrypt network packets, or any portion thereof, communicated via the appliance 208, may setup or establish SSL, TLS or other secure connections, for example, between the client(s) 202, the server(s) 204, and/or one or more other appliances 208, 212. In some embodiments, the encryption engine 324 may use a tunneling protocol to provide a VPN between a client 202 and a server 204. For example, in some embodiments, the encryption engine 324 may be in communication with the encryption processor 340. The compression engine 328 may compress network packets bi-directionally between the client(s) 202 and the server(s) 204 and/or between one or more of the appliances 208, 212.

The packet engine 322 may manage kernel-level processing of packets received and transmitted by the appliance 208 via the network stack(s) 320 to send and receive network packets via the network port(s) 314. The packet engine 322 may, for example, operate in conjunction with the encryption engine 324, the cache manager 318, the policy engine 326, and/or the compression engine 328 to perform encryption/decryption, traffic management such as request-level content switching and request-level cache redirection, and/or compression and decompression of data.

The user space 306 may be a memory area or portion of the operating system used by user mode applications or programs otherwise running in user mode. A user mode application may, for example, not access the kernel space 316 directly and may instead use service calls in order to access kernel services. As shown in FIG. 3, the user space 306 may, for example, include a graphical user interface (GUI) 330, a command line interface (CLI) 332, one or more shell services 334, one or more health monitoring programs 336, and/or one or more daemon services 338. The GUI 330 and/or the CLI 332 may enable a system administrator or other user to interact with and control the operation of the appliance 208, such as via the operating system of the appliance 208. The shell service(s) 334 may, for example, include programs, services, tasks, processes, and/or executable instructions to support interaction with the appliance 208 by a user via the GUI 330 and/or the CLI 332.

The health monitoring program(s) 336 may monitor, check, report and/or ensure that network systems are functioning properly and that users are receiving requested content over a network, for example, by monitoring activity of the appliance 208. In some embodiments, the health monitoring program(s) 336 may intercept and inspect any network traffic passed via the appliance 208. For example, the health monitor 336 may interface with one or more of the encryption engine 324, the cache manager 318, the policy engine 326, the compression engine 328, the packet engine 322, the daemon service(s) 338, and the shell service(s) 334 to determine a state, status, operating condition, and/or health of any portion of the appliance 208. Further, the health monitoring program(s) 336 may determine if a program, process, service and/or task is active and currently running, check status, error, and/or history logs provided by any program, process, service and/or task to determine any condition, status and/or error with any portion of the appliance 208. Additionally, the health monitoring program(s) 336 may measure and monitor the performance of any application, program, process, service, task, and/or thread executing on the appliance 208.

The daemon service(s) 338 are programs that run continuously or in the background and handle periodic service requests received by the appliance 208. In some embodiments, a daemon service 338 may, for example, forward such requests to other programs and/or processes, such as another daemon service 338, as appropriate.

As described herein, the appliance 208 may relieve the server(s) 204 of much of the processing load caused by repeatedly opening and closing transport layer connections to the client(s) 202 by opening one or more transport layer connections with each server 204 and maintaining these connections to allow repeated data accesses by the client(s) 202 via the Internet (e.g., "connection pooling"). To perform connection pooling, the appliance 208 may translate or multiplex communications by modifying sequence numbers and acknowledgment numbers at the transport layer protocol level (e.g., "connection multiplexing"). The appliance 208 may also provide switching and/or load balancing for communications between the client(s) 202 and the server(s) 204.

Additional details of the implementation and operation of the appliance 208 may be as described in U.S. Pat. No. 9,538,345, issued Jan. 3, 2017, to Citrix Systems, Inc., of Fort Lauderdale, Fla., the teachings of which are hereby incorporated herein by reference in their entirety.

Figure 4:
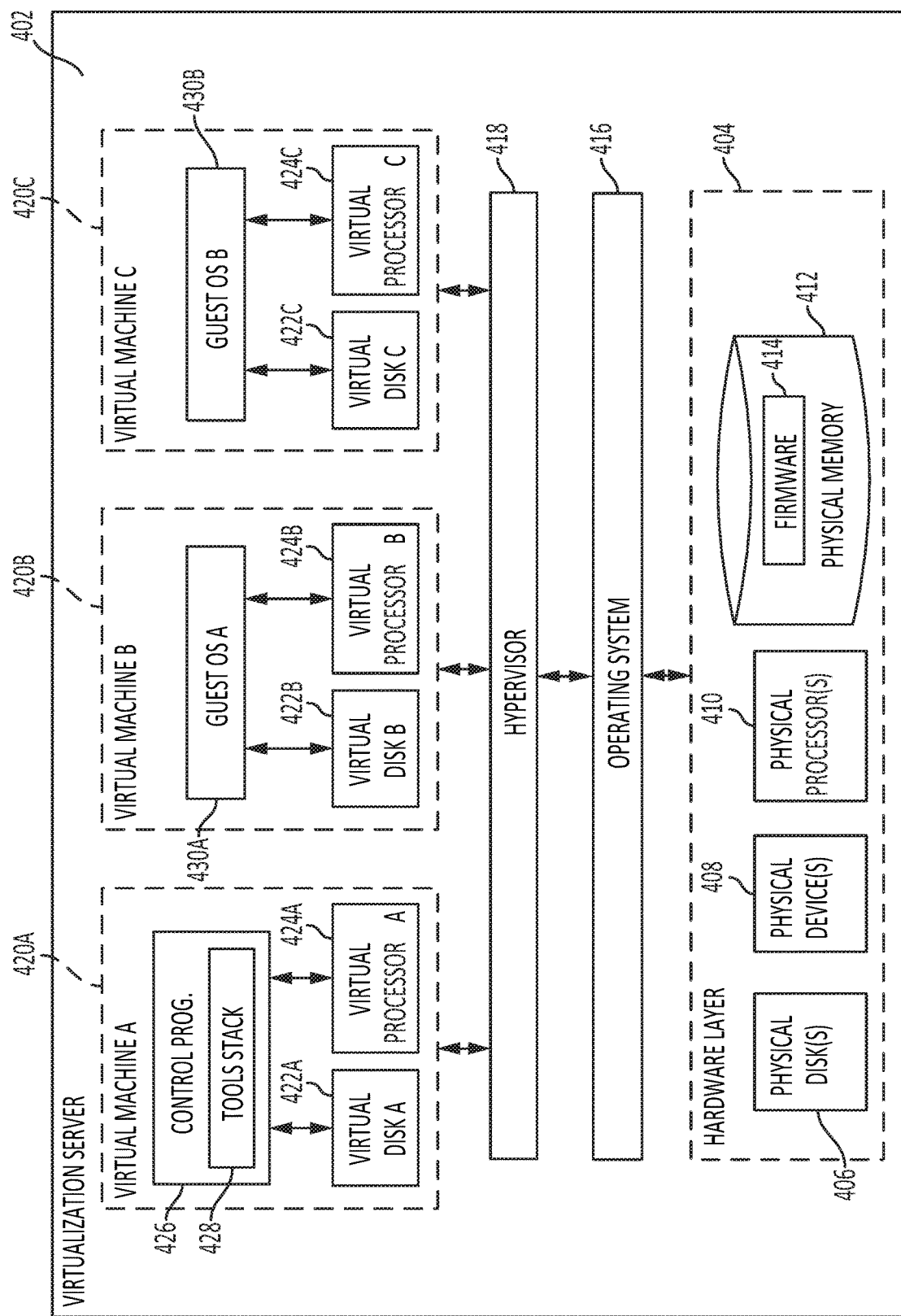
FIG. 4 is a block diagram illustrating components of an example embodiment of a server like that shown FIG. 2B.

D. Systems and Methods for Providing a Virtualized Application Delivery Controller FIG. 4 shows a high-level architecture of an illustrative application virtualization system. As shown, the application virtualization system may be single-server or multi-server system, or cloud system, including at least one virtualization server 402 configured to provide virtual desktops and/or virtual applications to one or more clients 202. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

In the example shown, a computing device is configured as a virtualization server 402 in a virtualization environment, for example, a single-server, multi-server, or cloud computing environment. The virtualization server 402 illustrated in FIG. 4 may, for example, be deployed as and/or implemented by one or more embodiments of the server 204a illustrated in FIG. 2B or by other known computing devices. Included in the virtualization server 402 is a hardware layer 404 that may include one or more physical disks 406, one or more physical devices 408, one or more physical processors 410, and/or one or more physical memories 412. Programs or executable instructions stored in the physical memory 412 may be executed by the one or more processors 410 of virtualization server 402. In some embodiments, firmware 414 may be stored within a memory element in the physical memory 412 and may likewise be executed by one or more of the physical processors 410.

The virtualization server 402 may further include an operating system 416 that may be stored in a memory element in the physical memory 412 and executed by one or more of the physical processors 410. Still further, a hypervisor 418 may be stored in a memory element in the physical memory 412 and may be executed by one or more of the physical processors 410.

Executing on one or more of the physical processors 410 may be one or more virtual machines 420A-C (generally 420). As illustrated, each virtual machine 420 may have a virtual disk 422A-C and a virtual processor 424A-C. In some embodiments, a first virtual machine 420A may execute, using a virtual processor 424A, a control program 426 that includes a tools stack 428. The control program 426 may be referred to as a control virtual machine, Dom0, Domain 0, or other virtual machine used for system administration and/or control. In some embodiments, one or more of the virtual machines 420B-C may execute, using a virtual processor 424B-C, a guest operating system 430A-B.

The physical device(s) 408 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 402. The physical memory 412 in the hardware layer 310 may include any type of memory. The physical memory 412 may store data, and in some embodiments may store one or more programs, or sets of executable instructions.

In some embodiments, the hypervisor 418 may be a program executed by one or more of the processors 410 to create and manage any number of the virtual machines 420. The hypervisor 418 may be referred to as a virtual machine monitor, or platform virtualization software. In some embodiments, the hypervisor 418 can be any combination of executable instructions and hardware that monitors virtual machines executing on a computing machine. The hypervisor 418 may, for example, be a Type 2 hypervisor, where the hypervisor executes within the operating system 416 executing on the virtualization server 402. The virtual machine(s) 420 may then execute at a level above the hypervisor 418. In some embodiments, the Type 2 hypervisor 418 may execute within the context of a user's operating system such that the Type 2 hypervisor interacts with the user's operating system. In other embodiments, one or more virtualization servers 402 in a virtualization environment may instead include a Type 1 hypervisor (not shown). A Type 1 hypervisor may, for example, execute on the virtualization server 402 by directly accessing the hardware and resources within the hardware layer 404. That is, while a Type 2 hypervisor 418 accesses system resources through a host operating system 416, as shown, a Type 1 hypervisor may directly access all system resources without the host operating system 416. A Type 1 hypervisor may thus execute directly on one or more physical processors 410 of the virtualization server 402, and may include program data stored in the physical memory 412.

The hypervisor 418, in some embodiments, may provide virtual resources to the operating system(s) 430 or control program(s) 426 executing on the virtual machine(s) 420 in any manner that simulates the operating systems 430 or control programs 426 having direct access to system resources. System resources may include, but are not limited to, the physical device(s) 408, the physical disk(s) 406, the physical processor(s) 410, the physical memory 412, and/or any other component included in virtualization server 402 hardware layer 404. The hypervisor 418 may, for example, be used to emulate virtual hardware, partition physical hardware, virtualize physical hardware, and/or execute virtual machines that provide access to computing environments. In some embodiments, the virtualization server 402 may execute a hypervisor 418 that creates a virtual machine platform on which guest operating systems may execute. In such embodiments, the virtualization server 402 may be referred to as a host server. An example of such a virtualization server is the Citrix Hypervisor™ provided by Citrix Systems, Inc., of Fort Lauderdale, Fla.

As noted above, the hypervisor 418 may create one or more of the virtual machines 420B-C in which the guest operating systems 430 execute. In some embodiments, the hypervisor 418 may load a virtual machine image to create a virtual machine 420. In other embodiments, the hypervisor 418 may execute a guest operating system 430 within a virtual machine 420. In still other embodiments, a virtual machine 420 may execute a guest operating system 430.

In addition to creating virtual machines 420, the hypervisor 418 may control the execution of at least one virtual machine 420. In other embodiments, the hypervisor 418 may present at least one virtual machine 420 with an abstraction of at least one hardware resource provided by the virtualization server 402 (e.g., any hardware resource available within the hardware layer 404). In other embodiments, the hypervisor 418 may control the manner in which the virtual machines 420 access the physical processor(s) 410 available in the virtualization server 402. Controlling access to the physical processor(s) 410 may include determining whether a virtual machine 420 should have access to a processor 410, and how physical processor capabilities are presented to the virtual machine 420.

In some embodiments, VMs 420 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Each of the virtual machines 420 may be implemented by way of a set of executable instructions that, when executed by a processor 410, may imitate the operation of a physical computer such that the virtual machine 420 can execute programs and processes much like a physical computing device. While FIG. 4 illustrates an embodiment in which a virtualization server 402 hosts three virtual machines 420, in other embodiments the virtualization server 402 can host any number of virtual machines 420. The hypervisor 418, in some embodiments, may provide each virtual machine 420 with a unique virtual view of the physical hardware, memory, processor, and other system resources available to that virtual machine 420. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, the hypervisor 418 may create one or more unsecure virtual machines 420 and one or more secure virtual machines 420. Unsecure virtual machines 420 may be prevented from accessing resources, hardware, memory locations, and programs that secure virtual machines 420 may be permitted to access. In other embodiments, the hypervisor 418 may provide each virtual machine 420 with a substantially similar virtual view of the physical hardware, memory, processor, and other system resources available to the virtual machines 420.

The virtual disk(s) 422, in some embodiments, provide a virtualized view of one or more of the physical disks 406 of the virtualization server 402, or a portion of one or more of the physical disks 406. The virtualized view of the physical disk(s) 406 may be generated, provided, and/or managed by the hypervisor 418. In some embodiments, the hypervisor 418 may provide each virtual machine 420 with a unique view of the physical disk(s) 406. Thus, in such embodiments, the particular virtual disk 422 included in each virtual machine 420 may be unique when compared with the other virtual disks 422.

In some embodiments, each virtual processor 424 may provide a virtualized view of one or more of the physical processors 410 of the virtualization server 402. In some embodiments, the virtualized view of the physical processor(s) 410 may be generated, provided, and/or managed by the hypervisor 418. In some embodiments, one or more of the virtual processors 424 may have substantially all of the same characteristics of at least one of the physical processors 410. In other embodiments, one or more of the virtual processors 424 may provide a modified view of a physical processor 410 such that at least some of the characteristics of the virtual processor 424 are different than the characteristics of the corresponding physical processor 410.

Although shown in FIG. 4 as including a single virtualized device 402, a virtualized environment may be provided by a plurality of networked devices in a system in which at least one physical host executes a virtual machine. A device on which a VM executes may be referred to as a physical host and/or a host machine. For example, an appliance 208 may be additionally or alternatively implemented in a virtualized environment on any computing device, such as a client 202, a server 204, or an appliance 208. Such virtual appliances may, for example, provide functionality for availability, performance, health monitoring, caching and compression, connection multiplexing and pooling and/or security processing (e.g., firewall, VPN, encryption/decryption, etc.), similarly as described in regard to the appliance 208.

Additional details of the implementation and operation of a virtualized computing environment may be as described in U.S. Pat. No. 9,538,345, issued Jan. 3, 2017 to Citrix Systems, Inc. of Fort Lauderdale, Fla., the teachings of which are hereby incorporated herein by reference in their entirety.

In some embodiments, a server may execute multiple virtual machines 420, for example, on various cores of a multi-core processing system and/or various processors of a multiple processor device. For example, one or more of the processors 248 shown in FIG. 2D may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment on a client 202, server 204 or appliance 208, 212, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017, to Citrix Systems, Inc., of Fort Lauderdale, Fla., the teachings of which are hereby incorporated herein by reference in their entirety.

E. Systems and Methods for Providing File Sharing Over Network(s)

Figure 5A:
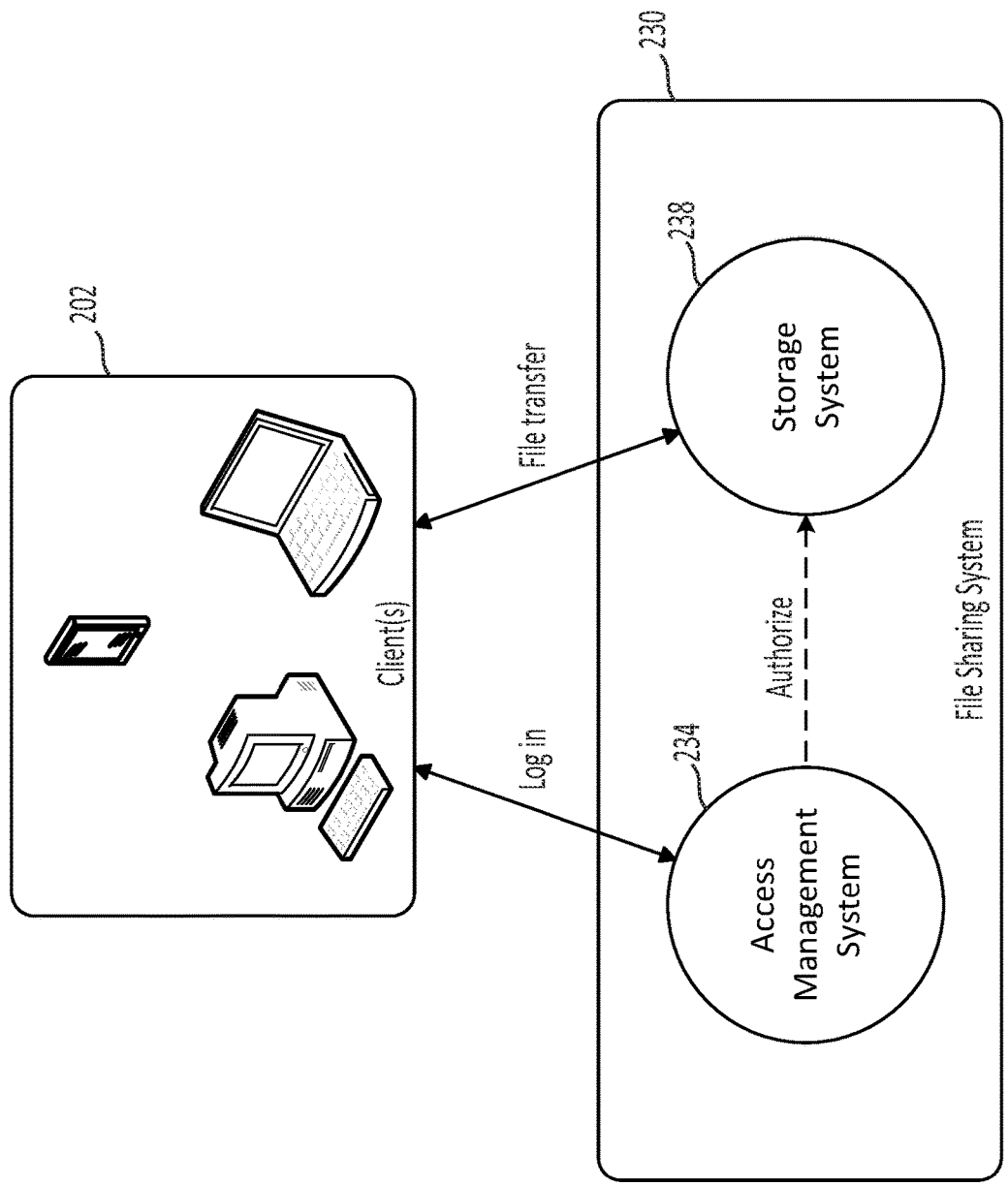
FIG. 5A is a diagram illustrating certain operations that may be performed by the file sharing system shown in FIG. 2C in accordance with some embodiments.

As discussed above in connection with FIG. 2C, in some embodiments, a file sharing system may be distributed between two sub-systems, with one subsystem (e.g., the access management system 234) being responsible for controlling access to files 228 stored in the other subsystem (e.g., the storage system 238). FIG. 5A illustrates conceptually how one or more clients 202 may interact with two such subsystems.

As shown in FIG. 5A, an authorized user operating a client 202, which may take on any of numerous forms, may log in to the access management system 234, for example, by entering a valid user name and password. In some embodiments, the access management system 234 may include one or more webservers that respond to requests from the client 202. The access management system 234 may store metadata concerning the identity and arrangements of files 228 (shown in FIG. 2C) stored by the storage system 238, such as folders maintained by the storage system 238 and any files 228 contained within such folders. In some embodiments, the metadata may also include permission metadata identifying the folders and files 228 each user is allowed to access. Once logged in, the user may employ a user-interface mechanism of the client 202 to navigate among folders for which the metadata indicates the user has access permission.

In some embodiments, the logged-in user may select a particular file 228 the user wants to access and/or to which the logged-in user wants a different user of a different client 202 to be able to access. Upon receiving such a selection from a client 202, the access management system 234 may take steps to authorize access to the selected file 228 by the logged-in client 202 and/or the different client 202. In some embodiments, for example, the access management system 234 may interact with the storage system 238 to obtain a unique "download" token which may subsequently be used by a client 202 to retrieve the identified file 228 from the storage system 238. The access management system 234 may, for example, send the download token to the logged-in client 202 and/or a client 202 operated by a different user. In some embodiments, the download token may a single-use token that expires after its first use.

In some embodiments, the storage system 238 may also include one or more webservers and may respond to requests from clients 202. In such embodiments, one or more files 228 may be transferred from the storage system 238 to a client 202 in response to a request that includes the download token. In some embodiments, for example, the download token may be appended to a URL that resolves to an IP address of the webserver(s) of the storage system 238. Access to a given file 228 may thus, for example, be enabled by a "download link" that includes the URL/token. Such a download link may, for example, be sent the logged-in client 202 in the form of a "DOWNLOAD" button or other user-interface element the user can select to effect the transfer of the file 228 from the storage system 238 to the client 202. Alternatively, the download link may be sent to a different client 202 operated by an individual with which the logged-in user desires to share the file 228. For example, in some embodiments, the access management system 234 may send an email or other message to the different client 202 that includes the download link in the form of a "DOWNLOAD" button or other user-interface element, or simply with a message indicating "Click Here to Download" or the like. In yet other embodiments, the logged-in client 202 may receive the download link from the access management system 234 and cut-and-paste or otherwise copy the download link into an email or other message the logged in user can then send to the other client 202 to enable the other client 202 to retrieve the file 228 from the storage system 238.

In some embodiments, a logged-in user may select a folder on the file sharing system to which the user wants to transfer one or more files 228 (shown in FIG. 2C) from the logged-in client 202, or to which the logged-in user wants to allow a different user of a different client 202 to transfer one or more files 228. Additionally or alternatively, the logged-in user may identify one or more different users (e.g., by entering their email addresses) the logged-in user wants to be able to access one or more files 228 currently accessible to the logged-in client 202.

Similar to the file downloading process described above, upon receiving such a selection from a client 202, the access management system 234 may take steps to authorize access to the selected folder by the logged-in client 202 and/or the different client 202. In some embodiments, for example, the access management system 234 may interact with the storage system 238 to obtain a unique "upload token" which may subsequently be used by a client 202 to transfer one or more files 228 from the client 202 to the storage system 238. The access management system 234 may, for example, send the upload token to the logged-in client 202 and/or a client 202 operated by a different user.

One or more files 228 may be transferred from a client 202 to the storage system 238 in response to a request that includes the upload token. In some embodiments, for example, the upload token may be appended to a URL that resolves to an IP address of the webserver(s) of the storage system 238. For example, in some embodiments, in response to a logged-in user selecting a folder to which the user desires to transfer one or more files 228 and/or identifying one or more intended recipients of such files 228, the access management system 234 may return a webpage requesting that the user drag-and-drop or otherwise identify the file(s) 228 the user desires to transfer to the selected folder and/or a designated recipient. The returned webpage may also include an "upload link," e.g., in the form of an "UPLOAD" button or other user-interface element that the user can select to effect the transfer of the file(s) 228 from the client 202 to the storage system 238.

In some embodiments, in response to a logged-in user selecting a folder to which the user wants to enable a different client 202 operated by a different user to transfer one or more files 228, the access management system 234 may generate an upload link that may be sent to the different client 202. For example, in some embodiments, the access management system 234 may send an email or other message to the different client 202 that includes a message indicating that the different user has been authorized to transfer one or more files 228 to the file sharing system, and inviting the user to select the upload link to effect such a transfer. Section of the upload link by the different user may, for example, generate a request to webserver(s) in the storage system and cause a webserver to return a webpage inviting the different user to drag-and-drop or otherwise identify the file(s) 228 the different user wishes to upload to the file sharing system 230. The returned webpage may also include a user-interface element, e.g., in the form of an "UPLOAD" button, that the different user can select to effect the transfer of the file(s) 228 from the client 202 to the storage system 238. In other embodiments, the logged-in user may receive the upload link from the access management system 234 and may cut-and-paste or otherwise copy the upload link into an email or other message the logged-in user can then send to the different client 202 to enable the different client to upload one or more files 228 to the storage system 238.

In some embodiments, in response to one or more files 228 being uploaded to a folder, the storage system 238 may send a message to the access management system 234 indicating that the file(s) 228 have been successfully uploaded, and an access management system 234 may, in turn, send an email or other message to one or more users indicating the same. For user's that have accounts with the file sharing system 230, for example, a message may be sent to the account holder that includes a download link that the account holder can select to effect the transfer of the file 228 from the storage system 238 to the client 202 operated by the account holder. Alternatively, the message to the account holder may include a link to a webpage from the access management system 234 inviting the account holder to log in to retrieve the transferred files 228. Likewise, in circumstances in which a logged-in user identifies one or more intended recipients for one or more to-be-uploaded files 228 (e.g., by entering their email addresses), the access management system 234 may send a message including a download link to the designated recipients (e.g., in the manner described above), which such designated recipients can then use to effect the transfer of the file(s) 228 from the storage system 238 to the client(s) 202 operated by those designated recipients.

Figure 5B:
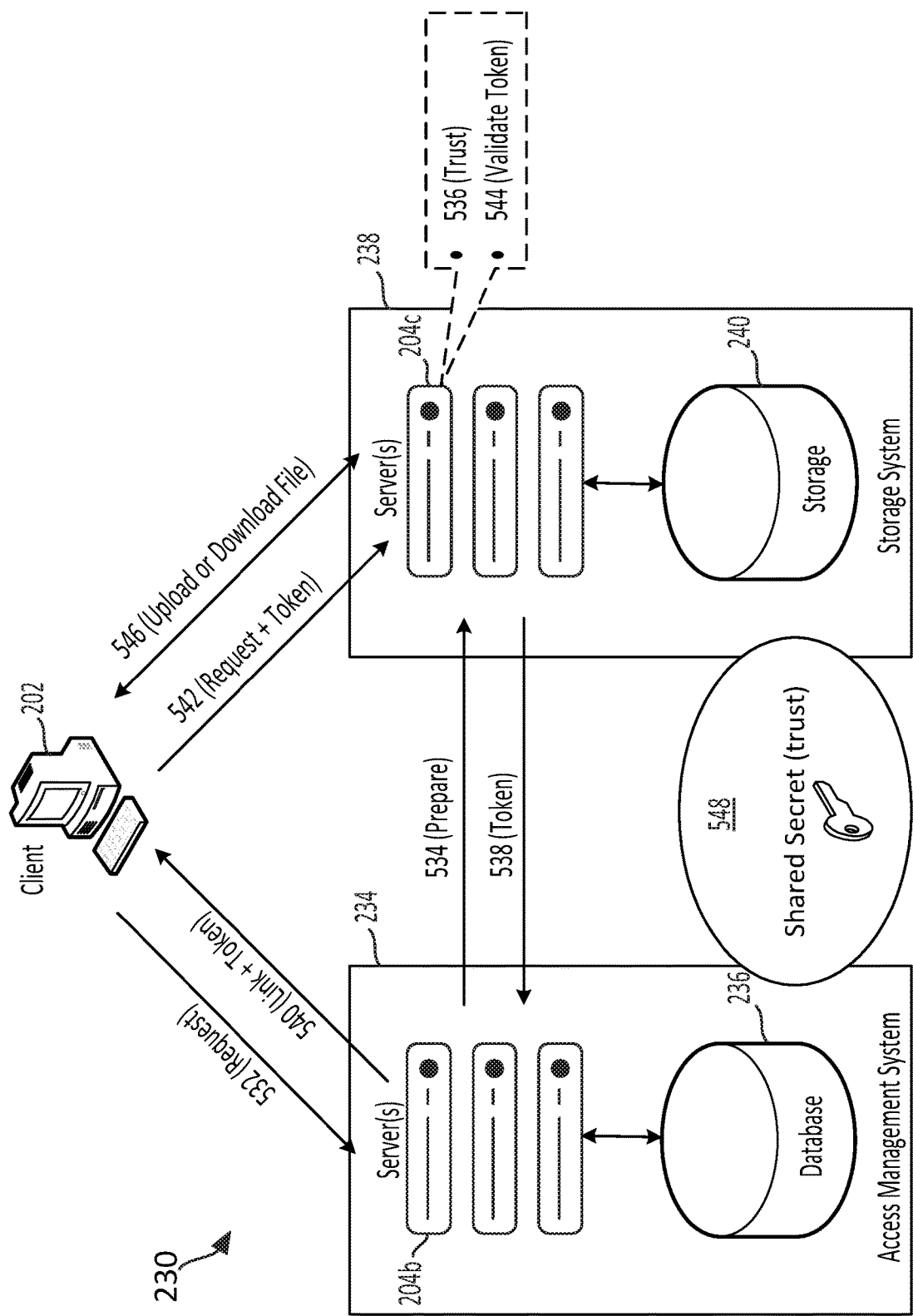
FIG. 5B is a diagram illustrating additional operations that may be performed by the file sharing system shown in FIG. 2C in accordance with some embodiments.

FIG. 5B is a block diagram showing an example of a process for generating access tokens (e.g., the upload tokens and download tokens discussed above) within the file sharing system 230 described in connection with FIGS. 2C and 5A.

As shown, in some embodiments, a logged-in client 202 may initiate the access token generation process by sending an access request 532 to the access management server(s) 204b. As noted above, the access request 532 may, for example, correspond to one or more of (A) a request to enable the downloading of one or more files 228 (shown in FIG. 2C) from the storage system 238 to the logged-in client 202, (B) a request to enable the downloading of one or more files 228 from the storage system 238 to a different client 202 operated by a different user, (C) a request to enable the uploading of one or more files 228 from a logged-in client 202 to a folder on the storage system 238, (D) a request to enable the uploading of one or more files 228 from a different client 202 operated by a different user to a folder of the storage system 238, (E) a request to enable the transfer of one or more files 228, via the storage system 238, from a logged-in client 202 to a different client 202 operated by a different user, or (F) a request to enable the transfer of one or more files 228, via the storage system 238, from a different client 202 operated by a different user to a logged-in client 202.

In response to receiving the access request 532, an access management server 204*b* may send a "prepare" message 534 to the storage control server(s) 204*c* of the storage system 238, identifying the type of action indicated in the request, as well as the identity and/or location within the storage medium 240 of any applicable folders and/or files 228. As shown, in some embodiments, a trust relationship may be established (step 536) between the storage control server(s) 204*c* and the access management server(s) 204*b*. In some embodiments, for example, the storage control server(s) 204*c* may establish the trust relationship by validating a hash-based message authentication code (HMAC) based on shared secret or key 548).

After the trust relationship has been established, the storage control server(s) 204*c* may generate and send (step 538) to the access management server(s) 204*b* a unique upload token and/or a unique download token, such as those as discussed above.

After the access management server(s) 204*b* receive a token from the storage control server(s) 204*c*, the access management server(s) 204*b* may prepare and send a link 540 including the token to one or more client(s) 202. In some embodiments, for example, the link may contain a fully qualified domain name (FQDN) of the storage control server(s) 204*c*, together with the token. As discussed above, the link 540 may be sent to the logged-in client 202 and/or to a different client 202 operated by a different user, depending on the operation that was indicated by the request.

The client(s) 202 that receive the token may thereafter send a request 542 (which includes the token) to the storage control server(s) 204*c*. In response to receiving the request, the storage control server(s) 204*c* may validate (step 544) the token and, if the validation is successful, the storage control server(s) 204*c* may interact with the client(s) 202 to effect the transfer (step 546) of the pertinent file(s) 228, as discussed above.

F. Systems and Methods for Implementing Servers in a Cloud-Based Environment

Figure 6:
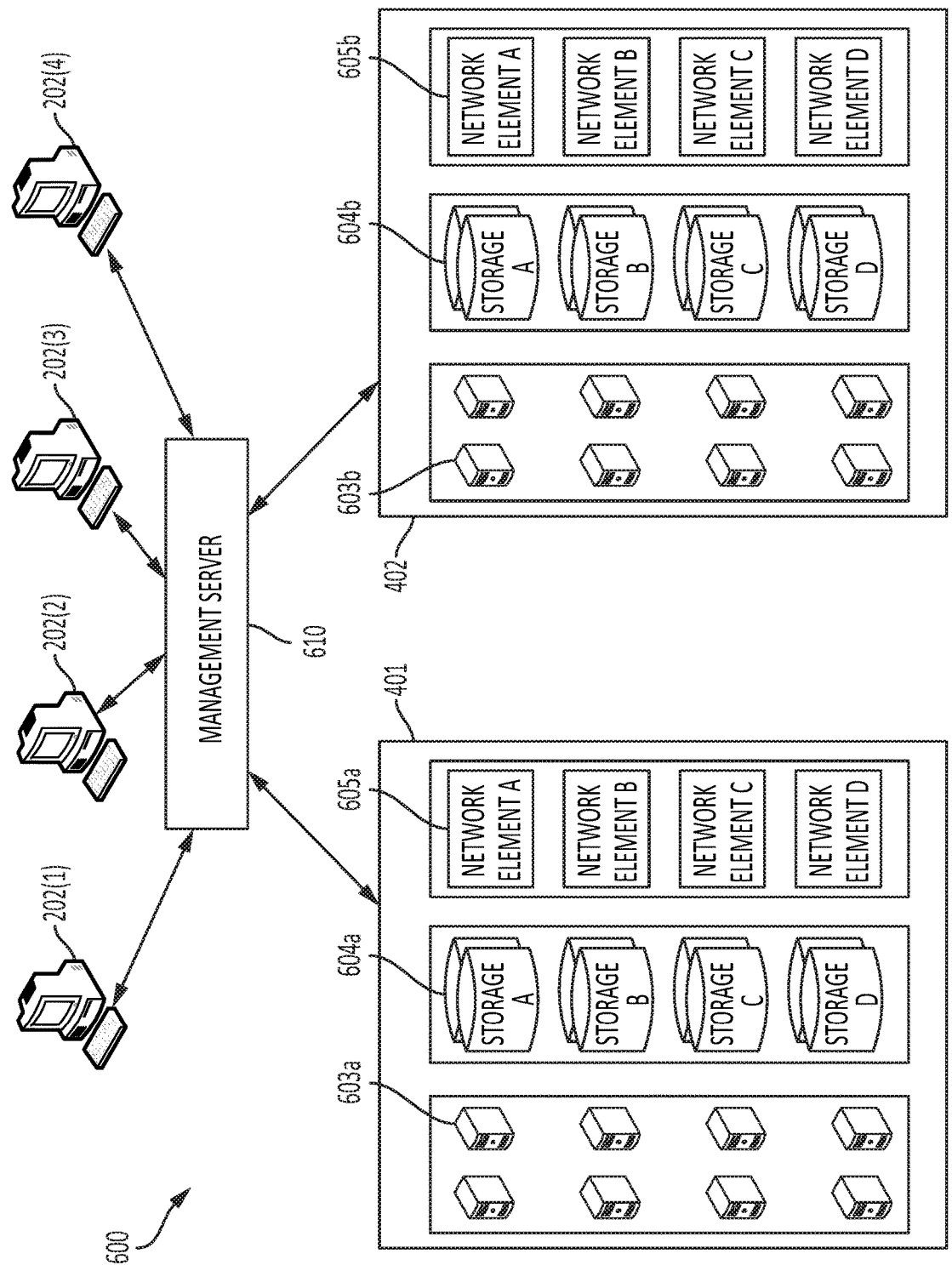
FIG. 6 is diagram illustrating an example cloud-based computing environment that may be used to implement one or more components of the networking systems shown in FIGS. 2A-D in some embodiments.

It should be appreciated that, in some embodiments, various aspects described herein may be implemented in a cloud-based environment. FIG. 6 illustrates an example of a cloud computing environment (or cloud system) 600. As seen in FIG. 6, one or more clients 202 may communicate with a cloud management server 610 to access the computing resources (e.g., host servers 603*a*-603*b* (generally referred herein as "host servers 603"), storage resources 604*a*-604*b* (generally referred herein as "storage resources 604"), and network resources 605*a*-605A (generally referred herein as "network resources 605")) of the cloud system 600.

The management server 610 may, for example, be implemented on one or more physical servers. In some embodiments, for example, the management server 610 may run, for example, Citrix Cloud™ by Citrix Systems, Inc., of Ft. Lauderdale, Fla., or OPENSTACK, among others. The management server 610 may manage various computing resources, including cloud hardware and software resources, for example, the host computers 603, the data storage devices 604, and the networking devices 605. The cloud hardware and software resources may include private and/or public components. For example, a cloud may be configured as a private cloud to be used by one or more particular customers or clients 202 and/or over a private network. In other embodiments, public clouds or hybrid public-private clouds may be used by other customers over an open or hybrid networks.

In some embodiments, the management server 610 may be configured to provide user interfaces through which cloud operators and cloud customers may interact with the cloud system 600. For example, the management server 610 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and/or perform other cloud administration tasks. The management server 610 may also include a set of APIs and/or one or more customer console applications with user interfaces configured to receive cloud computing requests from end users via clients 202, for example, requests to create, modify, and/or destroy virtual machines within the cloud. The clients 202 may connect to management server 610 via the Internet or some other communication network, and may request access to one or more of the computing resources managed by management server 610. In response to client requests, the management server 610 may include a resource manager configured to select and provision physical resources in the hardware layer of the cloud system based on the client requests. For example, the management server 610 and/or additional components of the cloud system may be configured to provision, create, and/or manage virtual machines and their operating environments (e.g., hypervisors, storage resources, services offered by the network elements, etc.) for customers at clients 202, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 202 may be related, for example, different computers creating virtual machines on behalf of the same end user, or different users affiliated with the same company or organization. In other examples, certain clients 202 may be unrelated, such as users affiliated with different companies or organizations. For unrelated clients, information on the virtual machines or storage of any one user may be hidden from other users.

Referring now to the physical hardware layer of a cloud computing environment, availability zones 601-602 (or zones) may refer to a collocated set of physical computing resources. Zones may be geographically separated from other zones in the overall cloud of computing resources. For example, zone 601 may be a first cloud datacenter located in California, and zone 602 may be a second cloud datacenter located in Florida. The management server 610 may be located at one of the availability zones, or at a separate location. Each zone may include an internal network that interfaces with devices that are outside of the zone, such as the management server 610, through a gateway. End users of the cloud (e.g., clients 202) might or might not be aware of the distinctions between zones. For example, an end user may request the creation of a virtual machine having a specified amount of memory, processing power, and network capabilities. The management server 610 may respond to the user's request and may allocate the resources to create the virtual machine without the user knowing whether the virtual machine was created using resources from zone 601 or zone 602. In other examples, the cloud system may allow end users to request that virtual machines (or other cloud resources) are allocated in a specific zone or on specific resources 603-605 within a zone.

In this example, each zone 601-602 may include an arrangement of various physical hardware components (or computing resources) 603-605, for example, physical hosting resources (or processing resources), physical network resources, physical storage resources, switches, and additional hardware resources that may be used to provide cloud computing services to customers. The physical hosting resources in a cloud zone 601-602 may include one or more computer servers 204, such as the virtualization server(s) 204a, the access management server(s) 204b, and/or the storage control server(s) 204c described above, which may be configured to create and host virtual machine instances. The physical network resources in a cloud zone 601 or 602 may include one or more network elements 605 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 601-602 may include storage disks (e.g., solid state drives (SSDs), magnetic hard disks, etc.) and other storage devices.

The example cloud computing environment shown in FIG. 6 also may include a virtualization layer (e.g., as shown in FIGS. 2b and 5) with additional hardware and/or software resources configured to create and manage virtual machines and provide other services to customers using the physical resources in the cloud. The virtualization layer may include hypervisors, as described above in FIG. 4, along with other components to provide network virtualizations, storage virtualizations, etc. The virtualization layer may be implemented as a separate layer from the physical resource layer, or may share some or all of the same hardware and/or software resources with the physical resource layer. For example, the virtualization layer may include a hypervisor installed in each of the virtualization servers 502 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

G. Detailed Description of Example Embodiments of a File Containerization & Management System (FCMS)

Figure 7:
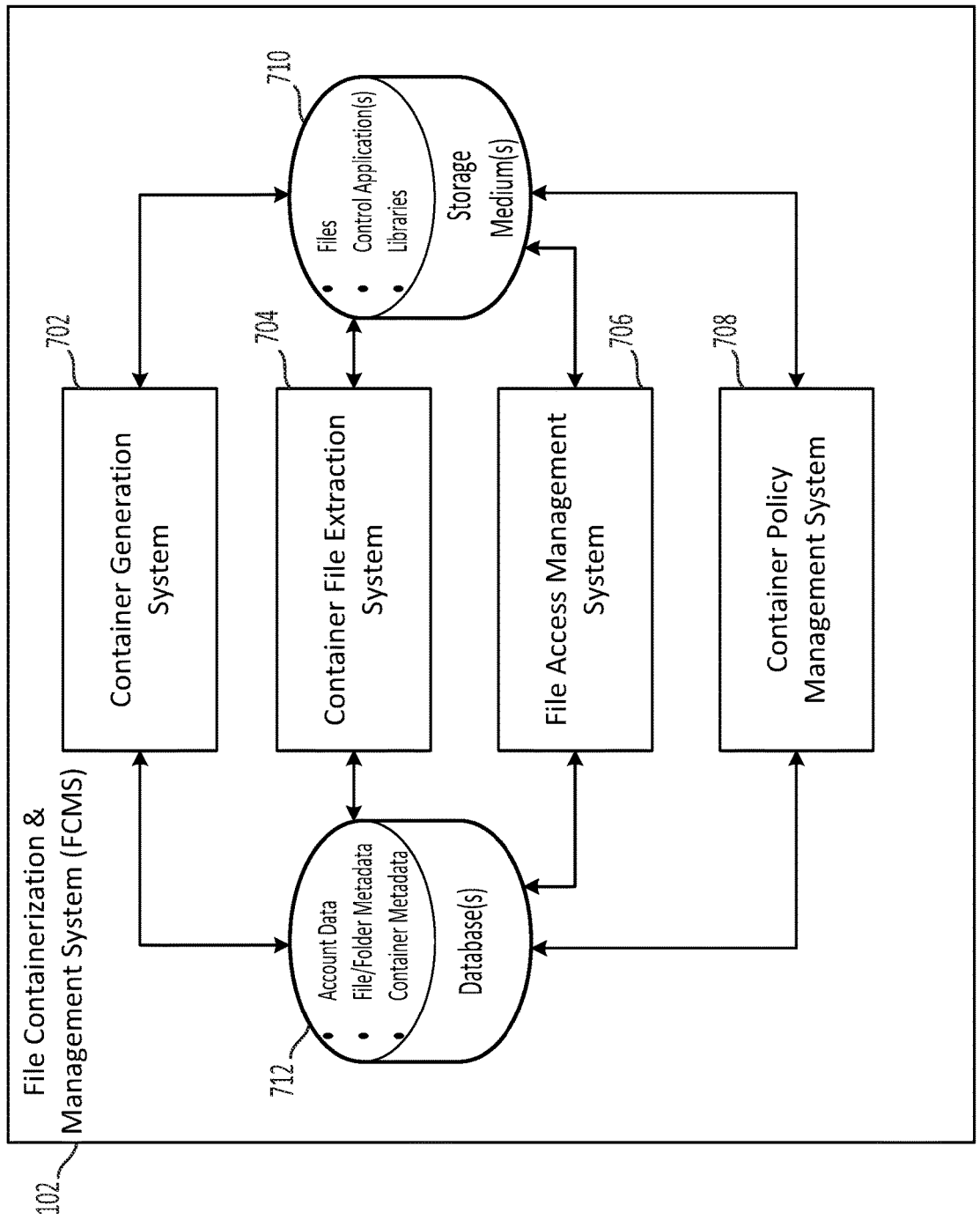
FIG. 7 is a block diagram showing an example embodiment of a file containerization and management system (FCMS) in accordance with the present disclosure.
Figure 10:
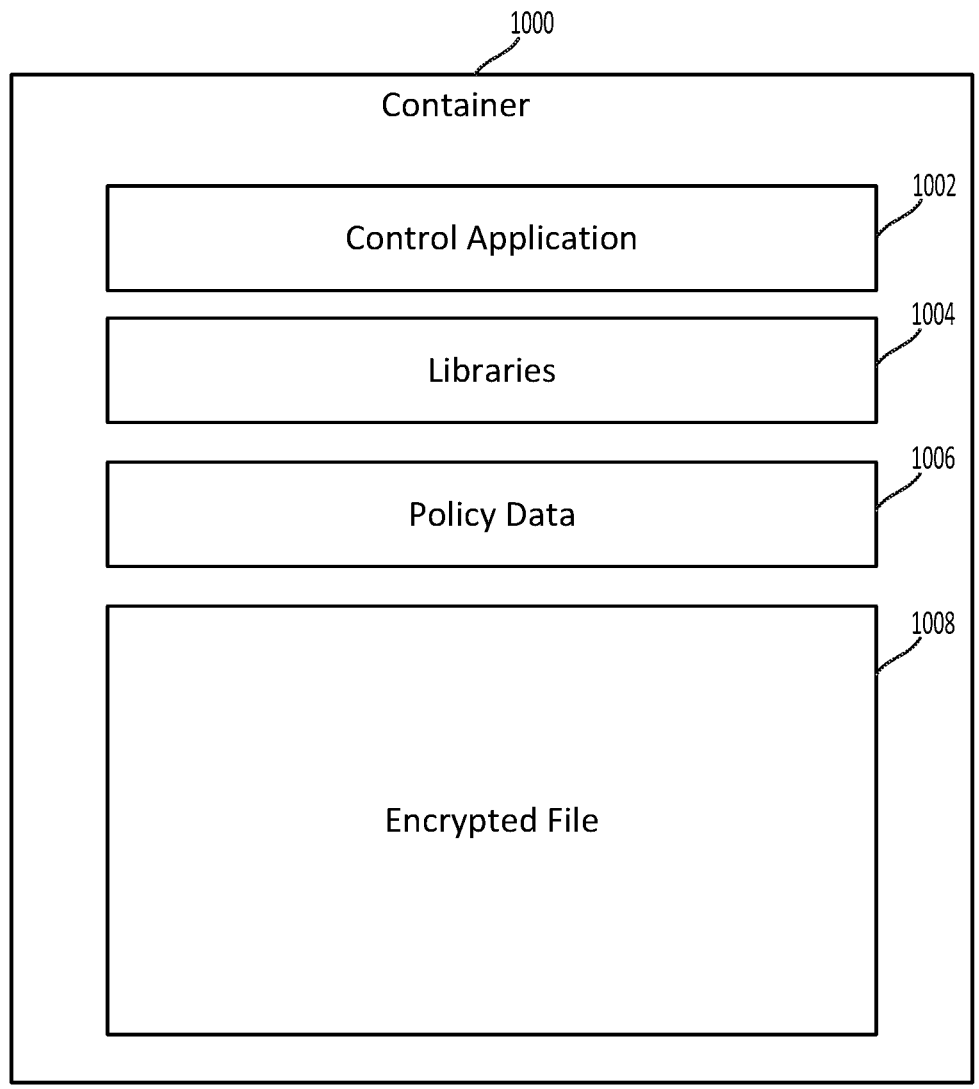
FIG. 10 is a block diagram showing an example configuration of a container that may be generated by the container generation system shown in FIG. 7.

FIG. 7 is a block diagram showing an example configuration of the file containerization & management system (FCMS) 102 introduced above in connection with FIG. 1. In some embodiments, the FCMS 102 may include, or may operate in conjunction with, a file sharing system or a file serving system, such as the file sharing system 230 described above in connection with FIGS. 2C, 5A, and 5B. In other embodiments, the FCMS 102 may operate as, or in conjunction with, a different type of file serving system that is capable of managing the storage and retrieval of files, as well as generating and managing the use of containers for such files that are distributed to clients 202. FIG. 10 is a block diagram of an example of a container 1000 that may be generated by the FCMS 102. The contents of the container 1000 are described in more detail below.

As shown in FIG. 7, in some embodiments, the FCMS 102 may include a container generation system 702, a container file extraction system 704, a file access management system 706, a container policy management system 708, one or more storage mediums 710, and one or more databases 712. In some embodiments, the container generation system 702, the container file extraction system 704, the file access management system 706, and/or the container policy management system 708 may each be implemented using one or more computer-readable mediums that are encoded with instructions which, when executed by one or more processors, cause one or more system components to perform actions such those described below in connection with routines 900, 1200, 1300, and 1400 (illustrated in FIGS. 9, 12, 13, and 14, respectively).

In some embodiments, all or portions of the container generation system 702, the container file extraction system 704, the file access management system 706, and/or the container policy management system 708 may be implemented using one or more servers 204 in one or both of the access management system 234 and the storage system 238 of the file sharing system 230 described above in connection with FIGS. 2C, 5A, and 5B, and/or one or more other servers 204 that operate in conjunction with the access management system 234 and/or the storage system 238. In other embodiments, the FCMS 102 may have a different architecture than the file sharing system 230 described herein. For example, in some embodiments, the FCMS 102 may not have separate access management and storage systems, and may instead employ one or more servers 204 that perform both access control functions and data storage functions. In such implementations, all or portions of the systems 702, 704, 706 and/or 708 may be implemented by one or more of those same servers 204.

Figure 11:
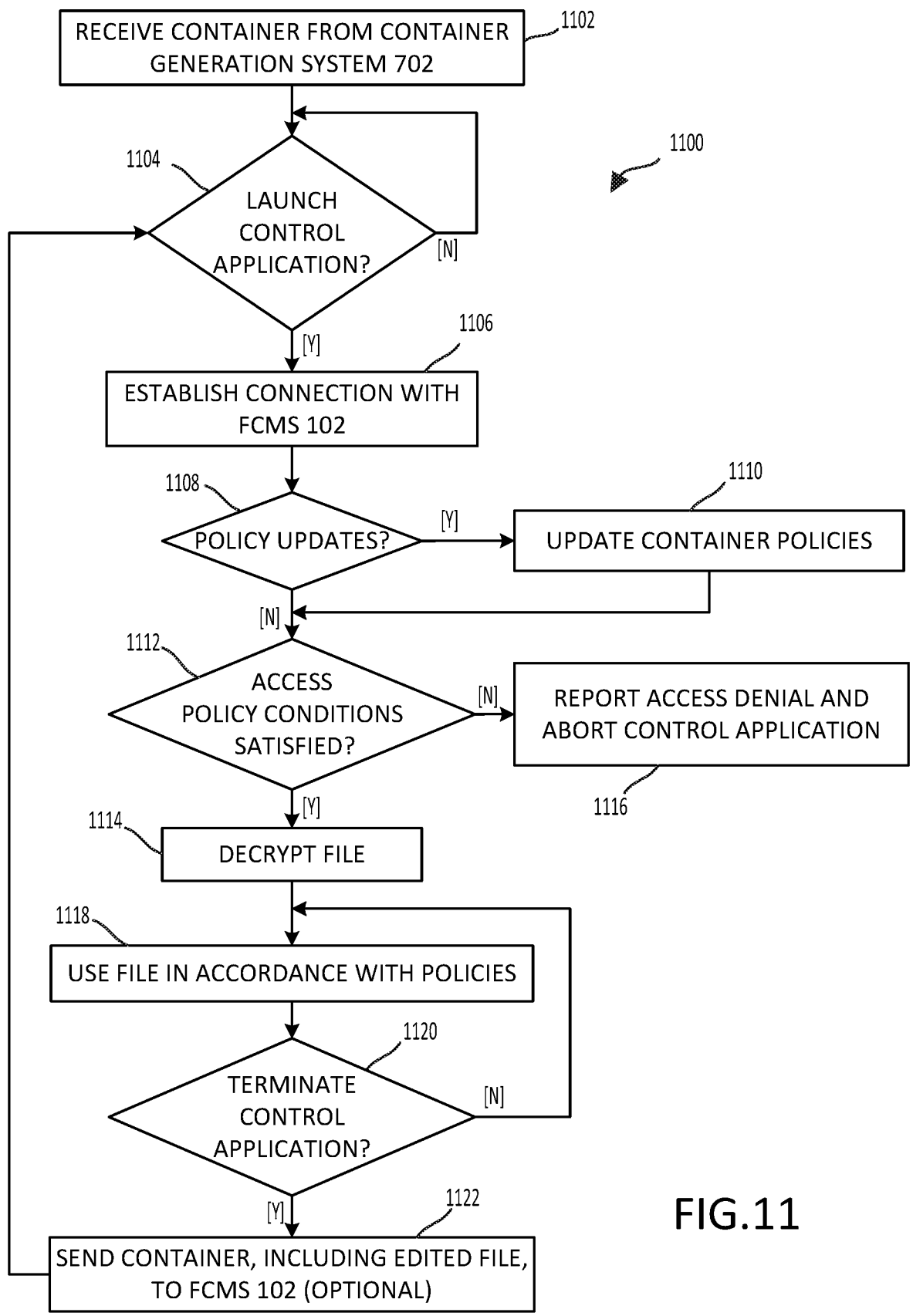
FIG. 11 is a flowchart illustrating an example of a routine that may be executed by a client, such as the first device shown in FIG. 1, that receives a container such as that shown in FIG. 10.

FIG. 11 shows an example of a routine 1100 that may be executed by a client 202, e.g., the first device 104 shown in FIG. 1, to obtain and use containers 1000 generated by the FCMS 102 as described herein. In some embodiments, the first device 104 of FIG. 1 may correspond to a client 202b, 202c of the file sharing system 230 described above in connection with FIGS. 2C, 5A, and 5B. The first device 104 may, for example, include one or more computer-readable mediums that are encoded with instructions which, when executed by one or more processors, cause the first device 104 to perform actions such those described below in connection with the routine 1100.

As shown in FIG. 7, the storage medium(s) 710 may include files that may be selectively containerized as described herein as well as control application(s) 1002 and various libraries 1004, e.g., from software development kits (SDKs) for applications or systems corresponding to the stored files, that may be combined into containers 1000 (see FIG. 10) along with such files, as described in more detail below. The storage medium(s) 710 may, for example, correspond, in whole or in part, to the storage medium 240 included in the storage system 238 of the file sharing system 230 described above in connection with FIGS. 2C, 5A, and 5B. In some embodiments, one storage medium 710 that is used to store the files and another storage medium 710 that is used to store the control applications(s) 1002 and libraries 1004 may be logically and/or physically separate from one another. For example, in some embodiments, all or portions of the systems 702, 704, 706 and/or 708 may be implemented by one or more servers 204 that are separate from the storage control server(s) 204c and that access a storage medium 710 that contains the control application(s) 1002 and libraries 1004, as discussed herein, but does not contain the files that are to be included in containers. In such implementations, such separate server(s) 204 may, for example, retrieve files for inclusion in containers 1000 in the same way that clients 202 can retrieve files from the file sharing system 230, as described above in connection with FIGS. 5A and 5B, or alternatively may retrieve such files from some other file sharing or serving system in some other way.

As also shown in FIG. 7, in some embodiments, the database(s) 712 may include account data, file/folder metadata, and container metadata. The database(s) 712 may, for example, correspond, in whole or in part, to the database 236 included in the access management system 234 of the file sharing system 230 described above in connection with FIGS. 2C, 5A, and 5B. Accordingly, the account data and file/folder metadata referenced in FIG. 7 may, at least in some embodiments, be the same as or similar to the account data and file/folder metadata that is used by the access management system 234 described above. The container metadata may, for example, include metadata corresponding to each of the containers 1000 that is generated by the FCMS 102. In some embodiments, the container metadata may be stored along with the file/folder metadata in the database 236 of the access management system 234. In other embodiments, for example, where all or portions of the systems 702, 704, 706, and/or 708 are implemented using one or more servers that are separate from the access management server(s) 204b of the file sharing system 230, the container metadata may be stored separately from the file/folder metadata. Examples of account data, file/folder metadata, and container metadata that may be stored in the database(s) 712 are shown in FIG. 8. The manner in which the container generation system 702, the container file extraction system 704, the file access management system 706, and the container policy management system 708 may interact with and use metadata like that shown in FIG. 8 in connection with some embodiments is explained in more detail below.

Figure 9:
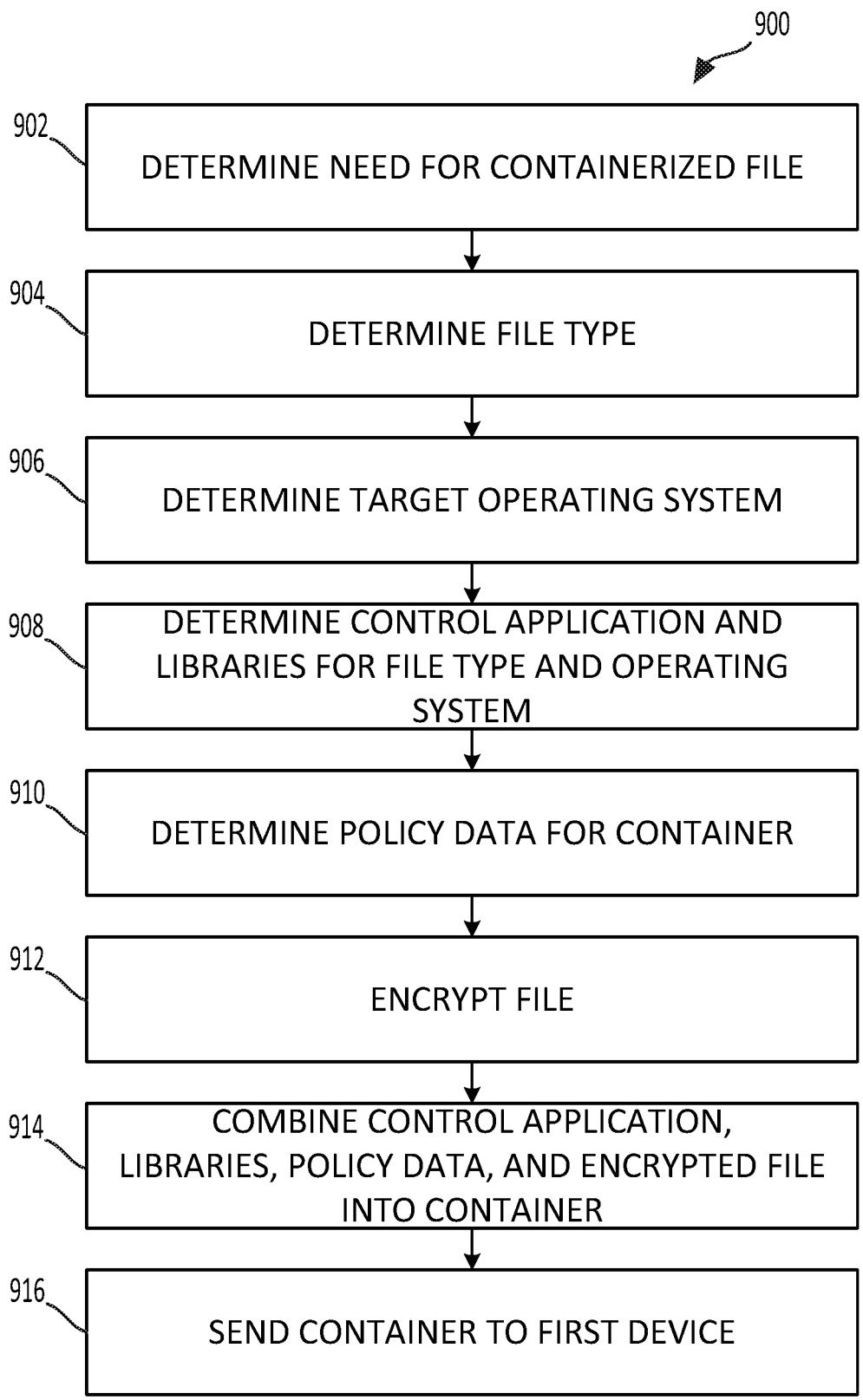
FIG. 9 is a flowchart illustrating an example of a routine that may be executed by the container generation system shown in FIG. 7.

FIG. 9 is a flowchart illustrating an example of a routine 900 that may be implemented by the container generation system 702 shown in FIG. 7 to generate a container 1000 such as that shown in FIG. 10. As shown, the routine 900 may begin at a step 902 when the container generation system 702 determines (step 902) that a container 1000 is to be generated for a particular file.

As noted above, in some embodiments, the routine 900 may be performed by one or more of the access management servers 204b and/or one or more of the storage control servers 204c described above in connection with FIGS. 2C and 5B, and/or by one or more other servers 204 that operate in conjunction with such access management server(s) 204b and/or such storage control sever(s) 204c.

In some such implementations, the determination of the step 902 may be made, for example, by one or more of the access management servers 204b, or by one or more servers 204 that operate in conjunction with the access management server(s) 204b, based at least in part on an access request 532 (see FIG. 5B) being received from a client 202 that identifies a file for which a download token is desired. In some embodiments, the access request 532 may explicitly indicate that a containerized version of a particular file is to be generated. For example, the client 202 sending the access request 532 may have determined, either based on user input or automatically, that the client 202 that will be receiving the file (which may either be the same client 202 that sent the access request 532 or another client 202) does not already have the software that is needed to view and/or edit the file in question.

In other embodiments, a need for a containerized file may be inferred or somehow ascertained by the FCMS 102 based at least in part on metadata associated with the file, account data associated with the user making the access request 532, account data associated with an anticipated recipient of the file, the circumstances or content of the access request 532, and/or other messages exchanged with the FCMS 102 in addition to the access request 532. For example, as shown in FIG. 8, in some embodiments, a file/folder metadata table 804 may include an entry 804d indicating that a file in the storage medium 710(s) corresponding to a file identifier (ID) 804b may only be transferred to a recipient device by way of a container 1000 as described herein. As another example, an account data table 802 may include an entry 802d for an account ID 802a indicating that a particular account holder may only receive files that have been containerized as described herein.

In still other embodiments, the determination of the step 902 may be made by one or more of the access management servers 204b any time an access request 532 for a download token is received. For example, in some embodiments, each access request 532 that is received may result in the generation (as described below) of at least one download token corresponding to a container 1000 in which the requested file is embedded, and if the FCMS 102 also permits the downloading of a non-containerized version of that same file, may additionally include another download token corresponding to a non-containerized version of the file. In such embodiments, the client 202 that receives the tokens may select, either automatically or in response to user input, which version of the file (i.e., containerized or non-containerized) is to be retrieved from the storage medium(s) 710, as explained below.

In other implementations, the determination of the step 902 may instead be performed by one or more of the storage control servers 204c described above in connection with FIGS. 2C and 5B, or by one or more other servers 204 that operate in conjunction with such storage control server(s) 204c. In some such implementations, the determination of the step 902 may be made by one or more of the storage control servers 204c based at least in part on a download request 542 (see FIG. 5B), which includes a download token for a particular file, being received from a client 202. The determination of whether a download request 542 indicates a need for a containerized version of the requested file may be made, for example, using one or more of the techniques discussed above with respect to the access request 532. For example, in some embodiments, some or all of the metadata from the tables shown in FIG. 8 may be sent to the storage system 238 along with the prepare message 534 (see FIG. 5B) so that such metadata may be available for use in determining whether to containerize a file, as well as to generate such a container 1000 in the manner explained below.

In yet other implementations, determination of the step 902 may instead be performed by one or more servers 204 that are separate from the server(s) 204b, 204c of the file sharing system 230 described above in connection with FIGS. 2C, 5A, and 5B, or another file sharing or serving system. For example, a client 202, e.g., the first device 104 shown in FIG. 1, may send a request for a containerized version of a file to such separate server(s) 204 and those server(s) 204 may make the determination of the step 902 based at least in part on the receipt of such a request. In such implementations, some of all of the remaining steps in the routine 900 may also be performed by such separate server(s) 204, but the file that is encrypted at the step 912 (as discussed below) may be retrieved from the file sharing system 230 or another file sharing or serving system, e.g., using the same technique as a client 202 to retrieve the to-be-containerized file, as described above in connection with FIGS. 5A and 5B. In some such implementations, such separate server(s) 204 may enjoy a trust relationship with the access management system 234 similar to that enjoyed between the access management system 234 and the storage system 238 by way of the shared secret 548 (as discussed above in connection with FIG. 5B), thus enabling the access management system 234 to share information in the database 236, e.g., file/folder metadata, etc., with the separate server(s) 204 implementing all or portions of the systems 702, 704, 706, and/or 708, and vice-versa.

As noted above, in yet other embodiments, the FCMS 102 may have an architecture that is different than the file sharing system 230 described herein. For example, in some embodiments, the FCMS 102 may not have separate access management and storage systems, and may instead employ one or more servers 204 that perform both access control functions and data storage functions. In such implementations the determination of the step 902 may correspond to a request from the first device 104 to such server(s) 204 for a containerized version of a particular file stored in the storage medium(s) 710, and all or portions of the remainder of the steps of the routine 900 may be performed by those same server(s) 204.

As shown in FIG. 9, upon determining that a containerized file is needed (step 902), the container generation system 702 may determine (step 904) the type of the file that is to be containerized. The determination of the step 904 may be made, for example, based on a file type entry 804c in the file/folder metadata table 804 (shown in FIG. 8) that is stored in the database(s) 712 (shown in FIG. 7). In embodiments implemented using a file sharing system such as the file sharing system 230 described above in connection with FIGS. 2C, 5A, and 5B, for example, one or more of the access managements servers 204b and/or the storage management servers 204c may make the determination of the step 904 based on the entry 804c.

As further shown in FIG. 9, the container generation system 702 may also determine (step 906) the operating system that is used by the client 202 to which the container 1000 is to be transferred, e.g., the first device 104 shown in FIG. 1. The determination of the step 906 may be made, for example, based on information contained in a received file access request and/or communications associated with that request, and/or based on account data stored in the database(s) 712. In embodiments implemented using a file sharing system such as the file sharing system 230 described above in connection with FIGS. 2C, 5A, and 5B, for example, one or more of the access managements servers 204b and/or the storage management servers 204c may make the determination of the step 906 based on information in an access request 532 or a download request 542 (see FIG. 5B), and/or based on entries 802b, 802c in the account data table 802 (shown in FIG. 8) for the account 802a of the target recipient.

As FIG. 9 also shows, the container generation system 702 may also determine (step 908) an applicable control application 1002 and one or more libraries 1004 that are to be included in the container 1000 (see FIG. 10) to allow a user of the recipient device, e.g., the user 106 of the first device 104 shown in FIG. 1, to view and/or edit the identified file. In some embodiments, the determined file type and target operating system may be used to identify a control application 1002 and one or more libraries 1004 stored in the storage medium(s) 710 that can be used to view and/or edit the identified file. For example, in some implementations, each file type may be associated with one or more predetermined SDK libraries stored in the storage medium(s) 710 that enable files of that type to be viewed and/or edited using a particular operating system. An additional table (not shown) may, for example, be used to correlate file types and operating systems with applicable libraries 1004. In some embodiments, for each possible operating system, e.g., Windows, LINUX, iOS, Android, etc., a large number of libraries 1004 may be designated as respective classes within a code base in the storage medium(s) 710 that also includes code for the control application 1002 (described in more detail below), and when the container 1000 is generated (as explained below) only the classes corresponding to the identified libraries 1004 may be instantiated. In other embodiments, different code bases may be used for different file type/operating system combinations.

As illustrated in FIG. 8, the container generation system 702 may, in some embodiments, populate a container configuration data table 806 for each container 1000 (see entry 806a) that is to be generated. For example, the container configuration data table 806 may be generated, and the fields 806a and 806b may be populated, in response to the determination of the step 902 shown in FIG. 9, and the fields 806c, 806d, and 806e may be populated as the respective determinations of the steps 904, 906, and 908 shown in FIG. 9 are made. Once populated, a container configuration data table 806 may define the parameters that are to be used when generating a container 1000 for the identified file, as described below.

As shown in FIG. 9, the container generation system 702 may additionally determine (step 910) policy data 1006 (see FIG. 10) that is to be included in the container 1000. As shown in FIG. 8, various types of policy data for the container 1000 may, for example, be included in a container policy data table 808 stored in the database(s) 712 shown in FIG. 7. The values in the container policy data table 808 may, for example, be set based on information that was included in a file access request received by the FCMS 102. For example, the FCMS 102 may receive (e.g., from the first device 104 or the second device 108 shown in FIG. 1) a request for a containerized version of a particular file, and such a request may include information corresponding to policy settings that were designated by the user that initiated the request. For example, a user interface may have been presented on the initiating user's computing device that allowed the user to not only identify a file to be containerized for transfer but also to select various policy settings, e.g., by selecting check boxes or the like, to be included in the generated container 1000 for the file. In other embodiments, some or all of the policy data in the container policy data table 808 may additionally or alternatively be determined by a system administrator either in advance, e.g., by identifying certain default values for the policy data, or in response to individual requests for containerized files. In still other embodiments, some or all of the policy data may additionally or alternatively be determined by the author of the file and/or the person who caused the file to be uploaded to the FCMS 102. In such embodiments, the file/folder metadata 804 (shown in FIG. 8) may, for example, include not only an indication 804d that a particular file needs to be containerized before it is transferred, but may additionally or alternatively include an indication 804e that one or more specific polices need to be applied, at least initially, to any such container 1000 that is generated for the corresponding file 804b.

No matter its origin, the policy data determined at the step 910 may be stored in the container policy data table 808 and may be associated with the metadata in the container configuration data table 806 corresponding to the container 1000. Examples of how the policy data for a container 1000 may impact the manner in which a file included in the container 1000 may be access and/or used is explained in more detail below in connection with the routine 1100 shown in FIG. 11.

As shown in FIG. 9, in some embodiments, the container generation system 702 may retrieve the identified file from the storage medium(s) 710 and then encrypt (step 912) the identified file if it has not already been encrypted. As shown in FIG. 8, a container security data table 810 may be populated with security data for each container 1000 (see entry 810a). As shown, the security data for a container 1000 may, for example, include a private key 810b and a public key 810c corresponding to the encryption technique applied to the file. As explained in more detail below, encrypting the file in this manner may, for example, allow access to the file within the container 1000 to be managed by controlling the circumstances in which a decryption key may be provided to a recipient device, e.g., the first device 104 shown in FIG. 1, to allow the encrypted file 1008 to be decrypted within the container 1000.

As further shown in FIG. 9, a containerized file may be generated by combining (step 914) the control application 1002, the identified libraries 1004, the policy data 1006 (from the table 808), and the encrypted file 1008 into a container 1000. As noted above, in some embodiments, for each possible operating system, e.g., Windows, LINUX, iOS, Android, etc., a large number of libraries 1004 may be designated as respective classes within a code base that also includes code for the control applications 1002. In such implementations, the step 914 may involve compiling the code base for the determined operating system into an executable file by instantiating only the library class(es) that correspond to the determined file type, and also appropriately embedding the policy data and the encrypted file within the resulting executable container 1000.

Although not illustrated in FIGS. 9 and 10, in some embodiments, the container generation system 702 may additionally combine into the container 1000 a virtual operating system and other software elements that enable the container 1000 to operate as a light-weight virtual machine on a client 202 (e.g., the first device 104 shown in FIG. 1), similar to the manner in which the virtual machines 420 operate on the virtualized device 402 shown in FIG. 4. In such implementations, the control application 1002 and the libraries 1004 may execute using the embedded virtual operating system of the container 1000 (such as the guest operating systems 430 shown in FIG. 4), rather than using a dedicated operating system of the client 202 (such as the operating system 416 shown in FIG. 4). The container 1000 in such implementations may thus be operating system independent and the container generation system 702 need not either determine the operating system of the target device (step 906) or determine (at the step 908) the control application 1002 and libraries 1004 that correspond to such an operating system. Instead, the container generation system 702 may simply employ a control application 1002 that is compatible with the to-be-embedded virtual operating system, and determine for inclusion in the container 1000 one or more libraries 1004 that correspond to the determined file type and the to-be-embedded virtual operating system.

As shown in FIG. 9, after a container 1000 has been generated at the step 914, the container generation system 702 may send (step 916) the container 1000 to one or more target devices, e.g., the first device 104 shown in FIG. 1. In embodiments in which the FCMS 102 is included within or operated in conjunction with the file sharing system 234 described above in connection FIGS. 2C, 5A, and 5B, the step 916 may involve a multi-step process in which a download token is generated for use by a client 202 to effect a download operation, as discussed above in connection with FIG. 5B. For example, in some embodiments, the generated container 1000 may be stored in the storage medium(s) 710 (which may or may not correspond to the storage medium 240 shown in FIGS. 2C and 5B), and a download token for the container 1000 may be sent from the storage system 238 to the access management system 234 (see step 538 in FIG. 5B). The access management system 234 may then send the download token to one or more clients 202 (see step 540 in FIG. 5B). The recipient client(s) 202 may then send a download request (including the download token) to the storage system 238 (see step 542 in FIG. 5B) to retrieve the corresponding container 1000 from the storage medium(s) 240/710 (see step 544 in FIG. 5B).

In other embodiments, as noted above, the determination to containerize a file at the step 902 of the routine 900 (shown in FIG. 9) may instead be made based on receipt of a download request including a download token for a particular file (see step 542 shown in FIG. 5B). In such an implementation, the step 916 may correspond to a storage control server 204c, or a server 204 operating in conjunction with a storage control server 204c, sending a generated container 1000 directly to the client 202 that sent the download request, e.g., the first device 104 shown in FIG. 1.

In yet other embodiments, e.g., those in which the container generation system 702 itself receives and processes requests from clients 202 for containerized versions of files and also manages the storage and retrieval of files for inclusion in containers 1000, the step 916 may correspond to the container generation system 702 sending a generated container 1000 directly to the client 202 that sent the request, e.g., the first device 104 shown in FIG. 1.

In still other embodiments, e.g., those in which the all or a portion of the container generation system 702 is implemented by one or more servers 204 separate from a file sharing or serving system, the step 916 may correspond to such separate server(s) 204 sending a generated container 1000, which includes a file retrieved from a separate file sharing or serving system, to the client 202 that requested a containerized version of such a file.

An example of a routine 1100 that may be executed by a client 202, e.g., the first device 104 shown in FIG. 1, will now be described with reference to FIG. 11. As shown, at a step 1102, the client 202 may receive a container 1000 from the container generation system 702 described above in connection with FIGS. 7-9.

At a step 1104, a determination may be made whether to begin execution of the container 1000 and launch the control application 1002 included within it. In some embodiments, execution of the container 1000 may begin automatically when the container 1000 is received by the client 202, perhaps after prompting the user for permission, or execution may begin in response to a user input requesting the same. As shown, when a determination is made to launch the control application 1002 in the container 1000, a process of the control application 1002 may cause a connection to be established (step 1106) between the container 1000 executing on the client 202 and the FCMS 102. Using such a connection, the control application 1002 may (at a step 1008) determine whether any of the policy data for the container 1000 has been modified. For example, in some embodiments, as described in more detail below, the routine 1300 executed by the container policy management system 708 of the FCMS 102 may allow entries in the container policy data table 808 (shown in FIG. 8) stored in the database(s) 712 to be updated, e.g., by a system administrator, the person who authored or uploaded the file to the FCMS 102, etc., and when a connection is established between the executing container 1000 and the FCMS 102 (see step 1406 in FIG. 14), the updated policy data in the table 808 may be sent to the container 1000 via the established connection (see step 1408 in FIG. 14).

If it is determined, at the step 1108 (FIG. 11), that one or more changes have been made to the policy data, then the control application 1002 may cause (see step 1110) the policy data 1006 included in the container 1000 to be updated accordingly. If, on the other hand, it is determined that no changes have been made to the policy data, then the routine 1100 may proceed immediately to a step 1112. Further details concerning possible types and uses of policy data are described below.

At the step 1112, in may be determined, e.g., based on the policy data 1006 in the container 1000, whether access to the encrypted file 1008 within the container 1000 is to be permitted. In some embodiments, for example, the policy data 1006 may indicate (see entries 808b, 808c, 808d, 808e, 808f in the container policy data table 808 shown in FIG. 8) that one or more authentication processes need to be correctly performed before access to the encrypted file 1008 will be granted. Illustrative examples of possible authentication techniques that may be employed at the step 1112 are described below. In other embodiments, the policy data 1006 may additionally or alternatively indicate (e.g., see field 808g) that the encrypted file 1008 may only be accessed if the container 1000 is at a geographic particular location, is executing on a particular client 202, or is being accessed in association with particular software executing on a client 202. The ShareFile® mobile app and the ShareFile® desktop app offered by Citrix Systems, Inc., of Fort Lauderdale, Fla., are examples of applications that might, for example, need to be used to access encrypted files 1008 using containers 1000 in accordance with the policy data 1006. In still other embodiments, the policy data 1006 may additionally or alternatively indicate (e.g., see fields 808h and 808i) that the encrypted file 1008 may only be accessed if the access attempt is made within a particular window of time. Further, in some embodiments, the policy data may indicate (e.g., see field 808j) whether the encrypted file 1008 is to be purged and/or destroyed when an attempt is made to access it at the step 1112.

As for possible pre-access authentication techniques that may be employed at the step 1112, an entry 808b in the container policy data table 808 (shown in FIG. 8) may indicate whether pre-access authentication of some form is required before access to the file will be permitted. The particular type(s) of authentication process(es) that are to be performed may, for example, be determined based on one or more of the other entries in the container policy data table 808. For example, as shown in FIG. 8, an entry 808c may specify whether the authentication process(es) are to require (A) authentication of the identity of a particular user of the client 202 on which the container 1000 is executing ("User"), (B) authentication of another person or group other than the person operating the client 202 on which the container 1000 is executing ("Secondary"), and/or (C) entry of a password that has been shared with the user of the client 202 on which the container 1000 is executing ("Password"). More specifically, the entries 808c and 808d in the container policy data table 808 may together indicate that a particular individual, e.g., John Doe, is an authorized user whose identity needs to be authenticated before access to the encrypted file 1008 within the container 1000 will be granted. Similarly, the entries 808c and 808e may together indicate that another individual or group, e.g., Jane Smith, is a secondary user/group (e.g., a system administrator, the author of the file, the person who caused the file to be uploaded to the FCMS 102, etc.) whose identity needs to be authenticated before access to the encrypted file 1008 within the container 1000 will be granted.

In some embodiments, implementation of such authentication process(es) may, for example, involve sending a file access request to the file access management system 706 of the FCMS 102 shown in FIG. 7, and awaiting a response granting access (e.g., a message including a decryption key for the encrypted file 1008). The manner in which the file access management system 706 may process such a file access request is described below in connection with FIG. 13. Examples of systems and techniques for authenticating the identity of such users/individuals/groups are described, for example, in co-pending application entitled "AUTHENTICATION FOR SECURE FILE SHARING," filed on the same day as this application, the entire contents of which are hereby incorporated by reference. The entries 808b and 808f in the container policy data table 808 may indicate that the control application 1002 is to require a user to enter a password matching the contents of the field 808f before access to the encrypted file 1008 within the container 1000 will be granted.

If the applicable conditions specified in the policy data 1006 are satisfied, at the step 1112, then the routine 1100 may proceed to the step 1114, at which the encrypted file 1008 within the container 1000 may be decrypted. In some embodiments, for example, satisfying all of the specified pre-access policy conditions may cause or allow a decryption key for the file to be sent, via the established connection, from the FCMS 102 (e.g., from the container security data table 810 shown in FIG. 8) to the container 1000 for use in decrypting the encrypted file 1008. In some embodiments, even if the policy data does not require one or more authentication processes to be performed, a file access request may nonetheless be sent to the file access management system 706 upon the remaining pre-access policy conditions being met, so as to prompt the file access management system 706 to return a decryption key, as discussed below in connection with FIG. 13. If, on the other hand, it is determined at the step 1112 that one or more of the pre-access policy conditions are not satisfied, the control application 1002 may, for example, report the failed access attempt to the FCMS 102 (e.g., via the connection established at the step 1106) and cease executing (see step 1116).

As shown in FIG. 11, once the file has been decrypted (step 1114), the control application 1002 and libraries 1004 may be used (e.g., see step 1118) to access the decrypted file in accordance with the remaining policies specified by the policy data 1006. Referring to the container policy data table 808 (shown in FIG. 8), the entries 808k and 808l may, for example, respectively control whether the control application 1002 will allow the client 202 on which the container 1000 is executing to view and edit the file 1008.

At a step 1120 of the routine 1100, a determination may be made whether to stop executing the container and cease operation of the control application 1002. In some embodiments, a determination to terminate the control application 1002 may be made in response to user input to a client 202 executing the container 1000. In other embodiments, a determination to terminate the control application 1002 may additionally or alternatively be made based on the policy data 1006. For example, in some embodiments, the control application 1002 may be terminated it is determined that the container 1000 is being used in violation of a location restriction (e.g., as indicated by the field 808g) and/or a time restriction (e.g., see field 808i). As shown, in some embodiments, the file may be continue to be used (per the step 1118) until such time that it is determined, at the step 1120, that execution of the container 1000 is to cease. Before execution of the container 1000 is terminated, the file may be re-encrypted within the container 1000 using the key received from the FCMS 102 and that key may then be purged and/or destroyed.

As further shown in FIG. 11, once execution of the container 1000 has ceased (per step 1120), the container (including the re-encrypted file) may optionally be sent to the FCMS 102 for further processing. For example, as described below in connection with FIG. 12, in some embodiments, the encrypted file 1008 may have been edited while the container was executing on a client 202, and the FCMS 102, after it receives the container 1000 from the client 202, may decrypt and extract the edited file from the container and upload it to a folder of the storage medium(s) 710 (e.g., as indicated by the field 804a in the file/folder metadata table 804 shown in FIG. 8) as a new (edited) version of the file. As shown, following the step 1122, the routine 1100 may return to the step 1104 at which the routine 1100 may wait for execution of the container 1000 to begin once again.

Figure 12:
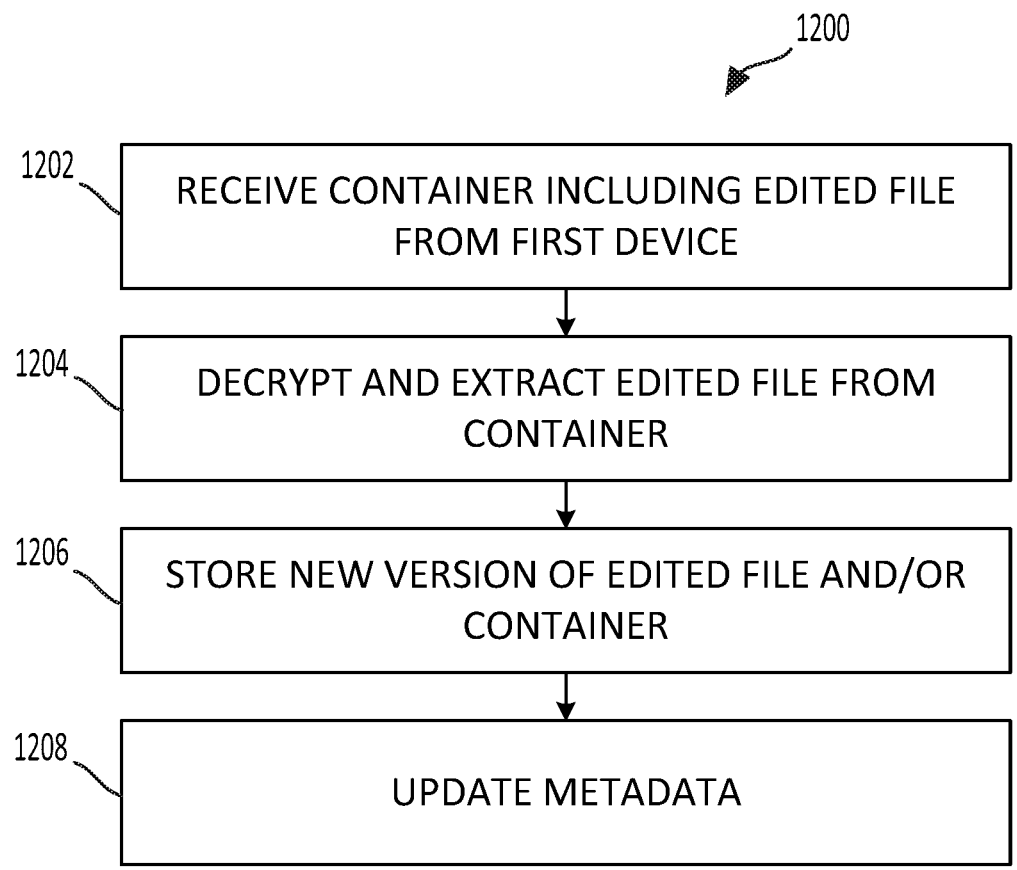
FIG. 12 is a flowchart illustrating an example of a routine that may be executed by the container file extraction system shown in FIG. 7.

FIG. 12 shows an example of a routine 1200 that may be executed by the container file extraction system 704 of the FCMS 102 shown in FIG. 7. As shown in FIG. 12, at a step 1202, the container file extraction system 704 may receive a container 1000 that includes an edited file from a client 202, e.g., the first device 104 shown in FIG. 1. Next, at a step 1204, the container file extraction system 704 may decrypt the encrypted, edited file and extract it from the container 1000. Then, at a step 1206, the extracted, edited file may be stored in the storage medium(s) 710. In some embodiments, for example, the edited file may be saved to the storage medium(s) 710 as a new version of the same file and may be uploaded to the same folder as the original file, e.g., the folder indicate by field 804a in the file/folder metadata table 804 shown in FIG. 8. In some embodiments, the container 1000 received from the client 202 may additionally or alternatively be stored in the storage medium(s) 710, so as to enable the same container to be retrieved and sent to the same or a different client 202 at a later time. Finally, at a step 1208, the metadata in the various tables discussed above in connection with FIG. 8 may be updated to reflect the new version of the file and/or container 1000 now stored in the storage medium(s) 710.

Figure 13:
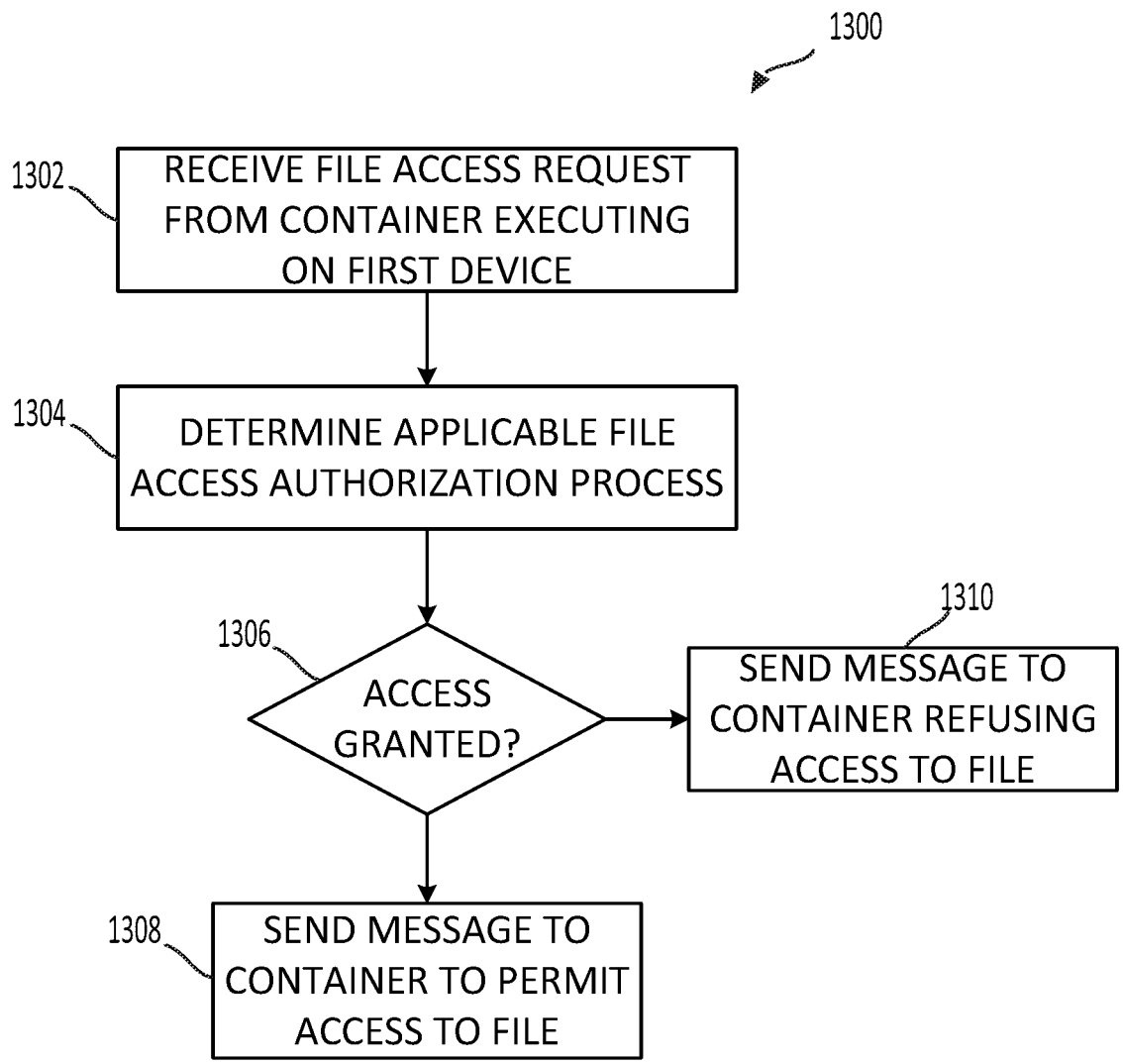
FIG. 13 is a flowchart illustrating an example of a routine that may be executed by the file access management system shown in FIG. 7.

FIG. 13 shows an example of a routine 1300 that may be executed by the file access management system 706 of the FCMS 102 shown in FIG. 7. As shown, at a step 1302, the file access management system 706 may receive a file access request from a container 1000 executing on a client, e.g., the first device 104 shown in FIG. 1. Such a file access request may, for example, have been generated by the control application 1002, based on the policy data 1006, as described above in connection with the step 1112 of the routine 1100 (shown in FIG. 11). As shown in FIG. 13, upon receiving such a file access request, the file access management system 706 may, at a step 1304, determine one or more processes to employ to perform authentication. Such processes may, in some embodiments, be determined based on the data in the container policy data table 808. In other embodiments, the applicable processes may be determined using other data stored in the database(s) 712 concerning files, accounts, etc. In some embodiments, the identity of an author of the file, an individual who uploaded the file to the system, and/or some or all of the people in a delegated group of individuals, may need to be authenticated, using biometric (e.g., fingerprint) authentication or otherwise. In other embodiments, the identity of the user of the client 202 that sent the access request (received at the step 1302) may additionally or alternatively need to be authenticated, using biometric (e.g., fingerprint) authentication or otherwise. Examples of systems and techniques for authenticating the identity of such users/individuals/groups are described, for example, in co-pending application entitled "AUTHENTICATION FOR SECURE FILE SHARING," filed on the same date as this application, the entire contents of which are hereby incorporated by reference.

Once all applicable authorization processes, involving identity authentication or otherwise, are satisfied, a determination may be made, at a step 1306, that access to the encrypted file 1008 is to be permitted, and a message may be sent to the container 1000, e.g., via the connection established at the step 1106 of the routine 1100 shown in FIG. 7, that enables the control application 1002 to access the encrypted file 1008. In some embodiments, for example, the file access management system 706 may, at a step 1308, send a decryption key, e.g., from the container security data table 810, to the container 1000 to allow the control application 1002 to decrypt the encrypted file 1008. In some embodiments, the policy data may indicate that no authentication processes are required for a particular container 1000. In such case, the file access management system 706 may simply send a decryption key to the container 1000 in response to receiving a file access request from the container 1000.

Figure 14:
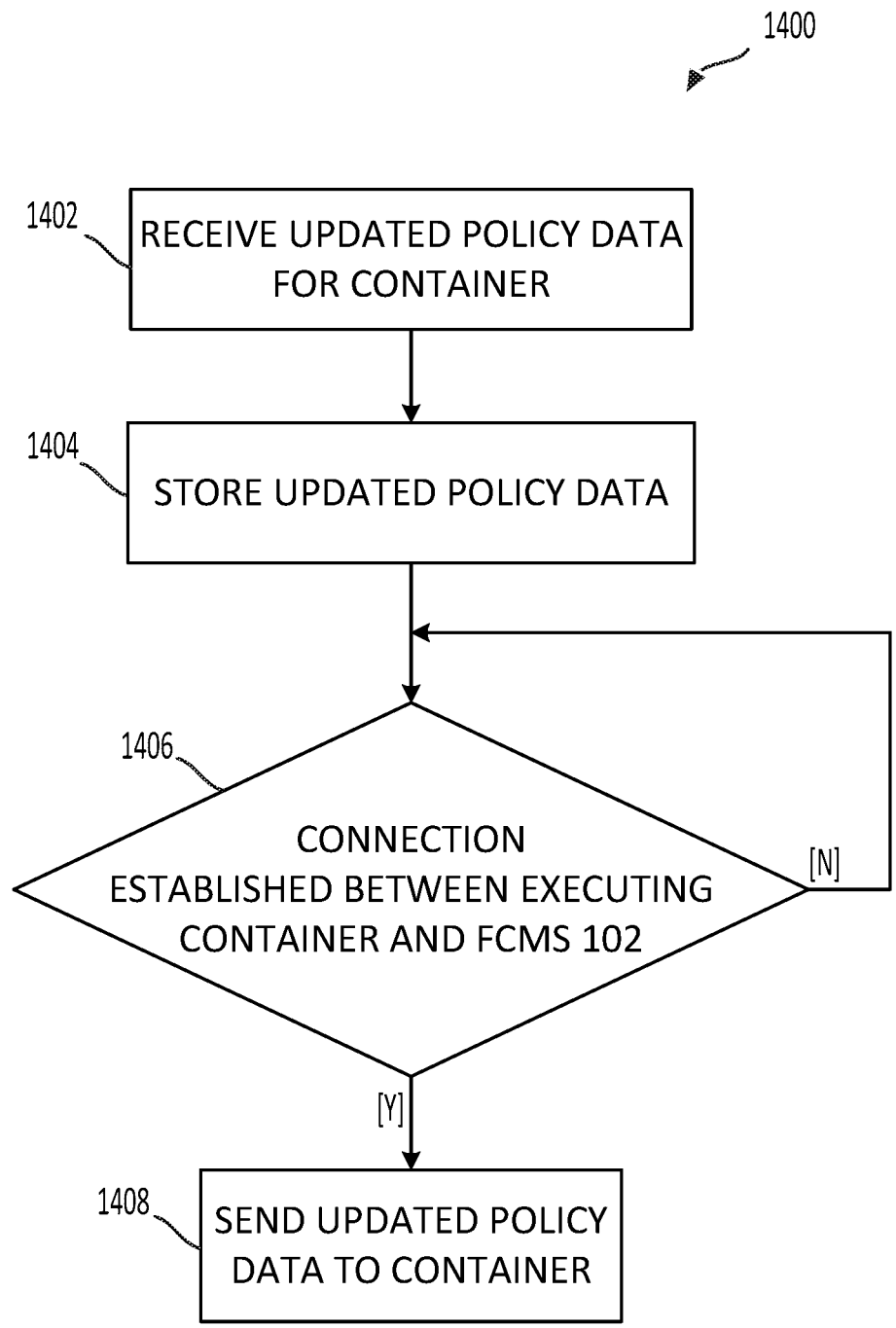
FIG. 14 is a flowchart illustrating an example of a routine that may be executed by the container policy management system shown in FIG. 7.

FIG. 14 shows an example of a routine 1400 that may be executed by the container policy management system 708 of the FCMS 102 shown in FIG. 7. As shown, at a step 1402, the container policy management system 708 may receive updated policy data for a particular container 1000. For example, in some embodiments, a system administrator or other authorized individual may have permission to effect changes to the container policy data table 808 stored in the database(s) 712. At the step 1404, any policy data that is so updated may, for example, be stored in the appropriate location(s) of the table 808. Next, the container policy management system 708 may wait, at a step 1406, until a connection is established with a container 1000 executing on a client 202, e.g., the first device 104 shown in FIG. 1. Such a connection may be established, for example, when the container first begins executing on the client 202, as discussed above in connection with steps 1104 and 1106 of the routine 1100 (shown in FIG. 11). Once a connection with the container 1000 has been established, at the step 1406, the container policy management system 708 may send the updated policy data in the table 808 to the container 1000 so that the container 1000 may update its corresponding policy data 1006, as discussed above in connection with the steps 1108 and 1110 of the routine 1100 (shown in FIG. 11). Thus, the FCMS 102 may update the policy data 1006 for a container even after the container 1000 has been sent to a client 202.

Figure 15:
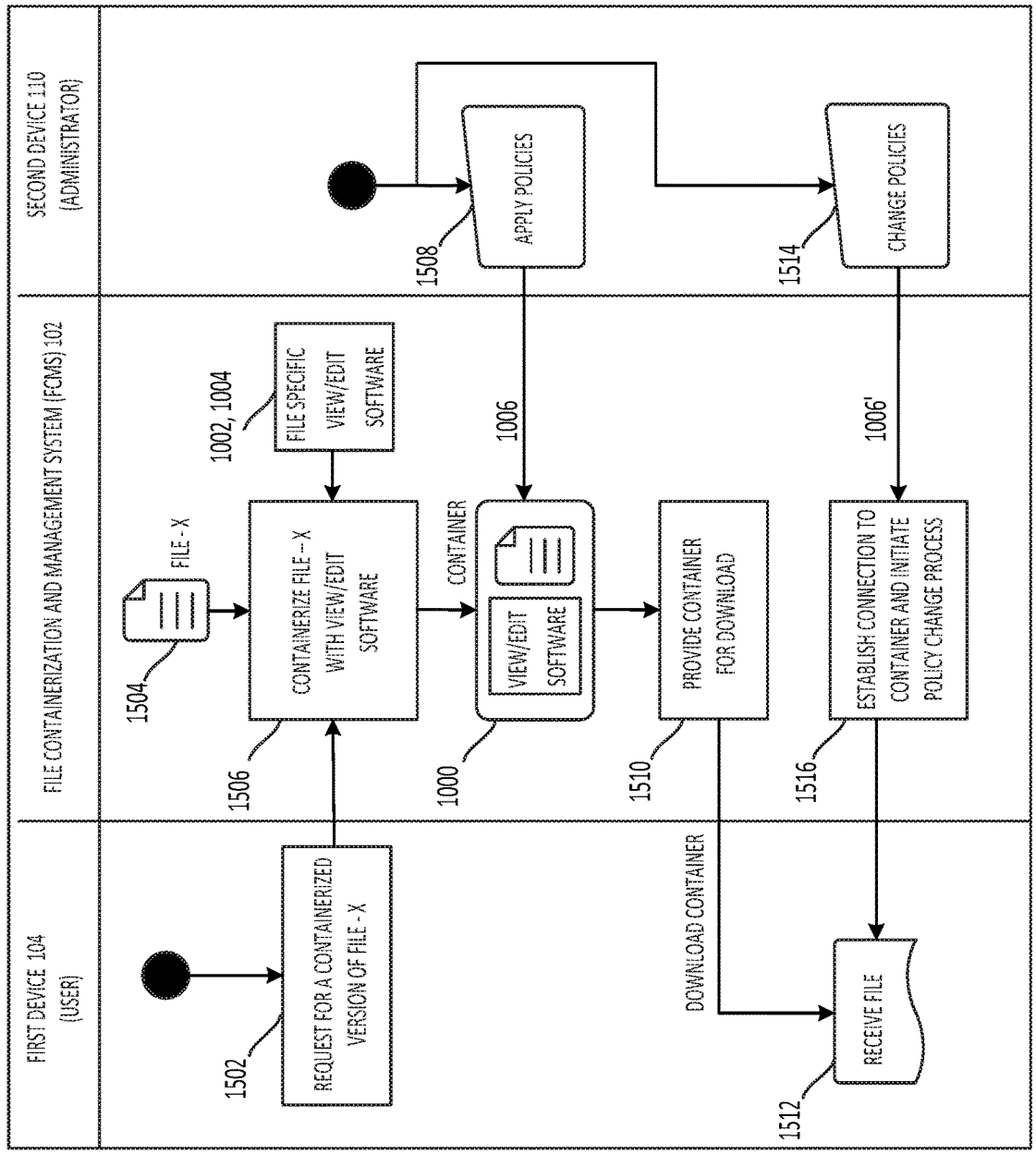
FIG. 15 is a functional block diagram illustrating how the first device, the second device, and the FCMS shown in FIGS. 1 and 7 may interact with one another, in accordance with an example implementation, to containerize a file and to update policy data applied to the resulting container.

FIG. 15 is a functional block diagram illustrating how the first device 104, the second device 110, and the FCMS 102 shown in FIG. 1 may interact with one another, in accordance with an example implementation, to containerize a file 1504 and to update the policy data 1006 applied to the resulting container 1000. As shown, the first device 104 may execute a process 1502 to send a request for a containerized version of a particular file 1504 ("File—X") to the FCMS 102. In response to that request, the FCMS 102 may execute a process 1506 that causes the file 1506 to be combined with file-specific view/edit software 1002, 1004 to generate the container 1000. After the container 1000 is generated (or prior to its generation), the second device 110 may execute a process 1508 to apply one or more new or updated policy data 1006 to the container. The container 1000 may then be made available for download via a download process 1510, and the first device 104 may execute a process 1512 to download to the container 1000. Thereafter, the second device 110 may execute a process 1514 to communicate changed policy data 1006' to the FCMS 102 and, upon establishing a connection to the container 1000, the updated policy data 1006' may be applied to the container 1000 while it is present on the first device 104.

H. Example Implementations of Methods, Systems, and Computer-Readable Media in Accordance with the Present Disclosure The following paragraphs (M1) through (M10) describe examples of methods implemented in accordance with the present disclosure.

(M1) A computing system may determine that a file stored in storage medium is to be included in a container to be sent to at least one computing component associated with a device including a user interface. The computing system may further determine that the file is of a particular type, determines code that can be used to access files of the particular type, combine the file and the code into the container, the container configured to be executed by the at least one computing component so as to cause content of the file to be presented by the user interface, and send the container to the at least one computing component.

(M2) A computing system may perform a method as described in paragraph (M1), wherein the at least one computing component is included in the device.

(M3) A computing system may perform a method as described in paragraph (M1), wherein the at least one computing component is located remote from the device.

(M4) A computing system may perform a method as described in any of paragraphs (M1) through (M3), and may further determine an operating system of the at least one computing component, and determine the code based at least in part on the operating system.

(M5) A computing system may perform a method as described in any of paragraphs (M1) through (M3), and may further include in the container a virtual operating system configured to execute the code.

(M6) A computing system may perform a method as described in any of paragraphs (M1) through (M5), and may further encrypt the file prior to combining the file and the code into the container, determine that a user of the device is authorized to access the file, and, based at least in part on the user being authorized to access the file, send a key for decrypting the file to the at least one computing component.

(M7) A computing system may perform a method as described in any of paragraphs (M1) through (M5), and may further include in the container policy information defining at least one of whether, how, where, when, or by whom the file can be accessed using the code.

(M8) A computing system may perform a method as described in paragraph (M7), and may further establish a communication link between the computing system and the container at the at least one computing component, and send an instruction via the communication link that causes a change to the policy information.

(M9) A computing system may perform a method as described in any of paragraphs (M1) through (M8), and may further determine that a user of the device is authorized to edit the file, and include in the container policy information that allows the code to edit the file based on input via the user interface.

(M10) A computing system may perform a method as described in any of paragraphs (M1) through (M9), and may further receive from the at least one computing component a modified version of the container that includes an edited version of the file based on input via the user interface, separate the edited version of the file from the modified version of the container, and store the edited version of the file.

The following paragraphs (S1) through (S8) describe examples of systems implemented in accordance with the present disclosure.

(S1) A system may comprise at least one processor and at least one computer-readable medium encoded with instructions which, when executed by the at least one processor, cause the system to determine that a file stored in storage medium is to be included in a container to be sent to at least one computing component associated with a device including a user interface, to determine that the file is of a particular type, to determine code that can be used to access files of the particular type, to combine the file and the code into the container, the container configured to be executed by the at least one computing component so as to cause content of the file to be presented by the user interface, and to send the container to the at least one computing component.

(S2) A system may be configured as described in paragraph (S1), and the at least one computer-readable medium may be encoded with additional instructions which, when executed by the at least one processor, further cause the system to determine an operating system of the at least one computing component, and to determine the code based at least in part on the operating system.

(S3) A system may be configured as described in paragraph (S1), and the at least one computer-readable medium may be encoded with additional instructions which, when executed by the at least one processor, further cause the system to further include in the container a virtual operating system configured to execute the code.

(S4) A system may be configured as described in any of paragraphs (S1) through (S3), and the at least one computer-readable medium may be encoded with additional instructions which, when executed by the at least one processor, further cause the system to encrypt the file prior to combining the file and the code into the container, to determine that a user of the device is authorized to access the file, and to send a key for decrypting the file to the at least one computing component based at least in part on the user being authorized to access the file.

(S5) A system may be configured as described in any of paragraphs (S1) through (S4), and the at least one computer-readable medium may be encoded with additional instructions which, when executed by the at least one processor, further cause the system to further include in the container policy information defining at least one of whether, how, where, when, or by whom the file can be accessed using the code.

(S6) A system may be configured as described in paragraph (S5), and the at least one computer-readable medium may be encoded with additional instructions which, when executed by the at least one processor, further cause the system to establish a communication link between the system and the container at the at least one computing component, and send an instruction via the communication link that causes a change to the policy information.

(S7) A system may be configured as described in any of paragraphs (S1) through (S6), and the at least one computer-readable medium may be encoded with additional instructions which, when executed by the at least one processor, further cause the system to determine that a user of the device is authorized to edit the file, and to further include in the container policy information that allows the code to edit the file based on input via the user interface.

(S8) A system may be configured as described in any of paragraphs (S1) through (S7), and the at least one computer-readable medium may be encoded with additional instructions which, when executed by the at least one processor, further cause the system to receive, from the at least one computing component, a modified version of the container that includes an edited version of the file based on input via the user interface, to separate the edited version of the file from the modified version of the container, and to store the edited version of the file.

The following paragraphs (CRM1) through (CRM8) describe examples of computer-readable media implemented in accordance with the present disclosure.

(CRM1) At least one computer-readable medium may be encoded with instructions which, when executed by at least one processor of a system, cause the system to determine that a file stored in storage medium is to be included in a container to be sent to at least one computing component associated with a device including a user interface, to determine that the file is of a particular type, to determine code that can be used to access files of the particular type, to combine the file and the code into the container, the container configured to be executed by the at least one computing component so as to cause content of the file to be presented by the user interface, and to send the container to the at least one computing component.

(CRM2) At least one computer-readable medium may be encoded with instructions as described in paragraph (CRM1), and may be further encoded with additional instructions which, when executed by the at least one processor, further cause the system to determine an operating system of the at least one computing component, and to determine the code based at least in part on the operating system.

(CRM3) At least one computer-readable medium may be encoded with instructions as described in paragraph (CRM1), and may be further encoded with additional instructions which, when executed by the at least one processor, further cause the system to further include in the container a virtual operating system configured to execute the code.

(CRM4) At least one computer-readable medium may be encoded with instructions as described in any of paragraphs (CRM1) through (CRM3), and may be further encoded with additional instructions which, when executed by the at least one processor, further cause the system to encrypt the file prior to combining the file and the code into the container, to determine that a user of the device is authorized to access the file, and to send a key for decrypting the file to the at least one computing component based at least in part on the user being authorized to access the file.

(CRM5) At least one computer-readable medium may be encoded with instructions as described in any of paragraphs (CRM1) through (CRM0), and may be further encoded with additional instructions which, when executed by the at least one processor, further cause the system to further include in the container policy information defining at least one of whether, how, where, when, or by whom the file can be accessed using the code.

(CRM6) At least one computer-readable medium may be encoded with instructions as described in paragraph (CRM5), and may be further encoded with additional instructions which, when executed by the at least one processor, further cause the system to establish a communication link between the system and the container at the at least one computing component, and send an instruction via the communication link that causes a change to the policy information.

(CRM7) At least one computer-readable medium may be encoded with instructions as described in any of paragraphs (CRM1) through (CRM3), and may be further encoded with additional instructions which, when executed by the at least one processor, further cause the system to determine that a user of the device is authorized to edit the file, and to further include in the container policy information that allows the code to edit the file based on input via the user interface.

(CRM8) At least one computer-readable medium may be encoded with instructions as described in any of paragraphs (CRM1) through (CRM7), and may be further encoded with additional instructions which, when executed by the at least one processor, further cause the system to receive, from the at least one computing component, a modified version of the container that includes an edited version of the file based on input via the user interface, to separate the edited version of the file from the modified version of the container, and to store the edited version of the file.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
   determining, by a computing system, that a file stored in storage medium is to be included in a container to be sent to at least one computing component associated with a device including a user interface, the at least one computing component being remote from the computing system;
   determining, by the computing system, that the file is of a particular type;
   determining, by the computing system, code that can be used to access files of the particular type;
   combining, by the computing system, the file and the code into the container, the container configured to be executed by the at least one computing component so as to cause content of the file to be presented by the user interface;
   further including in the container information defining at least one of whether, how, where, when, or by whom the file can be accessed using the code;
   sending, by the computing system, the container to the at least one computing component; and
   sending, by the computing system, an instruction via a communication link between the computing system and the container at the at least one computing component, the instruction configured to cause a change to the information included in the container.

2. The method of claim 1, wherein the at least one computing component is included in the device.

3. The method of claim 1, wherein the at least one computing component is located remote from the device.

4. The method of claim 1, wherein:
   the method further comprises determining, by the computing system, an operating system of the at least one computing component; and
   determining the code is further based at least in part on the operating system.

5. The method of claim 1, further comprising:
   further including in the container a virtual operating system configured to execute the code.

6. The method of claim 1, further comprising:
   encrypting the file prior to combining the file and the code into the container;
   after sending the container to the at least one computing component, receiving, by the computing system and from the at least one computing component, a request for access to the file;
   after receiving the request for access, determining, by the computing system, that a user of the device is authorized to access the file; and
   based at least in part on the user being authorized to access the file, sending, by the computing system and to the at least one computing component, a key for decrypting the file.

7. The method of claim 1, further comprising:
   determining, by the computing system, that a user of the device is authorized to edit the file;
   wherein including the information in the container comprises including, based at least in part on the user being authorized to access the file, first information in the container that allows the code to edit the file based on input via the user interface.

8. The method of claim 7, further comprising:
   receiving, by the computing system and from the at least one computing component, a modified version of the container that includes an edited version of the file based on input via the user interface;
   separating, by the computing system, the edited version of the file from the modified version of the container; and
   storing, by the computing system, the edited version of the file.

9. A system, comprising:
   at least one processor; and
   at least one computer-readable medium encoded with instructions which, when executed by the at least one processor, cause the system to:
      determine that a file stored in storage medium is to be included in a container to be sent to at least one computing component associated with a device including a user interface, the at least one computing component being remote from the system,
      determine that the file is of a particular type,
      determine code that can be used to access files of the particular type,
      combine the file and the code into the container, the container configured to be executed by the at least one computing component so as to cause content of the file to be presented by the user interface,
      further include in the container information defining at least one of whether, how, where, when, or by whom the file can be accessed using the code,
      send the container to the at least one computing component, and
      send an instruction via a communication link between the system and the container at the at least one computing component, the instruction configured to cause a change to the information included in the container.

10. The system of claim 9, wherein the at least one computer-readable medium is encoded with additional instructions which, when executed by the at least one processor, further cause the system to:
    determine an operating system of the at least one computing component; and
    determine the code based at least in part on the operating system.

11. The system of claim 9, wherein the at least one computer-readable medium is encoded with additional instructions which, when executed by the at least one processor, further cause the system to:
    further include in the container a virtual operating system configured to execute the code.

12. The system of claim 9, wherein the at least one computer-readable medium is encoded with additional instructions which, when executed by the at least one processor, further cause the system to:
    encrypt the file prior to combining the file and the code into the container;
    after sending the container to the at least one computing component, receive, from the at least one computing component, a request for access to the file;

after receiving the request for access, determine that a user of the device is authorized to access the file; and based at least in part on the user being authorized to access the file, send a key for decrypting the file to the at least one computing component.

13. The system of claim 9, wherein the at least one computer-readable medium is encoded with additional instructions which, when executed by the at least one processor, further cause the system to:

determine that a user of the device is authorized to edit the file; and include the information in the container at least in part by including in the container first information that allows the code to edit the file based on input via the user interface.

14. The system of claim 13, wherein the at least one computer-readable medium is encoded with additional instructions which, when executed by the at least one processor, further cause the system to:

receive, from the at least one computing component, a modified version of the container that includes an edited version of the file based on input via the user interface;

separate the edited version of the file from the modified version of the container; and store the edited version of the file.

15. At least one computer-readable medium encoded with instructions which, when executed by at least one processor of a system, cause the system to:

determine that a file stored in storage medium is to be included in a container to be sent to at least one computing component associated with a device including a user interface, determine that the file is of a particular type, determine code that can be used to access files of the particular type, combine the file and the code into the container, the container configured to be executed by the at least one computing component so as to cause content of the file to be presented by the user interface, further include in the container information defining at least one of whether, how, where, when, or by whom the file can be accessed using the code, send the container to the at least one computing component, and send, over a network, an instruction to the container at the at least one computing component, the instruction configured to cause a change to the information included in the container.

16. The at least one computer-readable medium of claim 15, wherein the at least one computer-readable medium is encoded with additional instructions which, when executed by the at least one processor, further cause the system to:

encrypt the file prior to combining the file and the code into the container;

after sending the container to the at least one computing component, receive, from the at least one computing component, a request for access to the file;

after receiving the request for access, determine that a user of the device is authorized to access the file; and based at least in part on the user being authorized to access the file, send a key for decrypting the file to the at least one computing component.

17. The at least one computer-readable medium of claim 15, wherein the at least one computer-readable medium is encoded with additional instructions which, when executed by the at least one processor, further cause the system to:

determine an operating system of the at least one computing component; and determine the code based at least in part on the operating system.

18. The at least one computer-readable medium of claim 15, wherein the at least one computer-readable medium is encoded with additional instructions which, when executed by the at least one processor, further cause the system to:

further include in the container a virtual operating system configured to execute the code.

19. The at least one computer-readable medium of claim 15, wherein the at least one computer-readable medium is encoded with additional instructions which, when executed by the at least one processor, further cause the system to:

determine that a user of the device is authorized to edit the file; and include the information in the container at least in part by including in the container first information that allows the code to edit the file based on input via the user interface.

20. The at least one computer-readable medium of claim 19, wherein the at least one computer-readable medium is encoded with additional instructions which, when executed by the at least one processor, further cause the system to:

receive, from the at least one computing component, a modified version of the container that includes an edited version of the file based on input via the user interface;

separate the edited version of the file from the modified version of the container; and store the edited version of the file.

* * * * *